US012762828B1

(12) United States Patent
Mulford et al.

(10) Patent No.: US 12,762,828 B1
(45) Date of Patent: Oct. 13, 2026

(54) OBJECT DETECTION SYSTEM DETERMINING OBJECT BOUNDARY EDGES FROM PENROSE GRADIENT DATA AND RELATED METHODS

(71) Applicant: EAGLE TECHNOLOGY, LLC, Melbourne, FL (US)

(72) Inventors: Michael Mulford, Pittsford, NY (US); Christopher Mullarkey, Rochester, NY (US); Julian Cuevas Paniagua, San Juan, PR (US); Stephanie Bertrand, Brooklyn, NY (US); Bernard V. Brower, Webster, NY (US); Kevin Watson, Fairfax, VA (US); Ronald Thomas Kneusel, Thornton, CO (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 398 days.

(21) Appl. No.: 18/471,427

(22) Filed: Sep. 21, 2023

(51) Int. Cl.

| | |
|---|---|
| ***G06V 10/44*** | (2022.01) |
| ***G06T 7/13*** | (2017.01) |
| ***G06T 7/168*** | (2017.01) |
| ***G06T 7/73*** | (2017.01) |
| ***G06V 10/764*** | (2022.01) |

(52) U.S. Cl.
CPC .............. *G06V 10/443* (2022.01); *G06T 7/13* (2017.01); *G06T 7/168* (2017.01); *G06T 7/74* (2017.01); *G06V 10/764* (2022.01); *G06T 2207/20048* (2013.01)

(58) Field of Classification Search
None
See application file for complete search history.

(56) References Cited

U.S. PATENT DOCUMENTS

| | | | |
|---|---|---|---|
| 6,259,396 | B1 | 7/2001 | Pham et al. |
| 10,387,752 | B1 | 8/2019 | Kim et al. |
| 10,402,628 | B2 | 9/2019 | Yang et al. |
| 10,467,503 | B1 | 11/2019 | Kim et al. |
| 10,937,158 | B1 | 3/2021 | He et al. |
| 10,977,765 | B2 | 4/2021 | Walvoord et al. |

(Continued)

OTHER PUBLICATIONS

Liu et al. "Generating binary tags for fast medical image retrieval based on convolutional nets and Radon Transform," 2016 International Joint Conference on Neural Networks (IJCNN), 2016, pp. 2872-2878, doi: 10.1109/IJCNN.2016.7727562.

(Continued)

*Primary Examiner* — Zhiyu Lu
(74) *Attorney, Agent, or Firm* — ALLEN, DYER, DOPPELT, GILCHRIST, P.A. Attorneys at Law

(57) ABSTRACT

An object detection system may include a memory and a processor cooperating with the memory to determine gradient data from image data corresponding to a scene, with the scene including an object therein, and process the gradient data using a Penrose transform to generate Penrose gradient data including a plurality of peaks corresponding to the object. The processor may also perform edge filtering on the Penrose gradient data to determine boundary edges corresponding to the object based upon the plurality of peaks, determine a classification of the object based upon the determined boundary edges using an object classification model, and output the object classification.

22 Claims, 17 Drawing Sheets

DIFFERENT CROSS HATCH BY COLORS

120

(56) References Cited

U.S. PATENT DOCUMENTS

| | | | | |
|---|---|---|---|---|
| 2014/0028801 A1* | 1/2014 | Tin | G01N 21/55 | 348/136 |
| 2023/0087261 A1* | 3/2023 | Unnikrishnan | G06T 7/50 | 382/100 |
| 2023/0298322 A1* | 9/2023 | Ndiour | G06V 10/82 | 382/100 |

OTHER PUBLICATIONS

Hamdi et al. "Combining Fingerprints and their Radon Transform as Input to Deep Learning for a Fingerprint Classification Task" 2018 15th International Conference on Control, Automation, Robotics and Vision (ICARCV), 2018, pp. 1448-1453, doi: 10.1109/ICARCV.2018.8581072.
Ling et al. "Aircraft pose estimation based on mathematical morphological algorithm and Radon transform" 2011 Eighth International Conference on Fuzzy Systems and Knowledge Discovery (FSKD), 2011, pp. 1920-1924, doi: 10.1109/FSKD.2011.6019888.
Ling et al. "Aircraft pose estimation based on polar function descriptor" 2012 9th International Conference on Fuzzy Systems and Knowledge Discovery, 2012, pp. 1702-1706, doi: 10.1109/FSKD.2012.6234157.
Jiang et al. "Pose estimation based on exploration of geometrical information in SAR images" 2016 IEEE Radar Conference (RadarConf), 2016, pp. 1-4, doi: 0.1109/ RADAR.2016.7485084.
Tokuda et al. "Convolutional neural network-based visual servoing for eye-to-hand manipulator" IEEE Access, ACCESS.2021.309173, 2021. pp. 16.
Trabelsi et al. "Deep Complex Networks" CoRR, vol. abs/1705.09792v4, 2018. pp. 19.
Tan et al. "Complex-Valued 3-D Convolutional Neural Network for PolSAR Image Classification" in IEEE Geoscience and Remote Sensing Letters, vol. 17, No. 6, pp. 1022-1026, Jun. 2020, doi: 10.1109/LGRS.2019.2940387.
Gao et al. "Enhanced Radar Imaging Using a Complex-Valued Convolutional Neural Network" in IEEE Geoscience and Remote Sensing Letters, vol. 16, No. 1, pp. 35-39, Jan. 2019, doi: 10.1109/LGRS.2018.2866567.
Zhu et al. "Deep Learning Meets SAR: Concepts, models, pitfalls, and perspectives" in IEEE Geoscience and Remote Sensing Magazine, vol. 9, No. 4, pp. 143-172, Dec. 2021, doi: 10.1109/MGRS.2020.3046356.
Bassey et al. "A survey of complex-valued neural networks" arXiv preprint arXiv:2101.12249 (2021). pp. 15.
Xu et al. "A man-made object detection algorithm based on contour complexity evaluation" Chinese-Journal of Aeronautics, https://www.sciencedirect.com/science/article/pii/S1000936117301930}, 2017. pp. 11.
Bai et al. "Multiple linear feature detection based on multiple-structuring-element center-surround top-hat transform" Appl. Opt., Optica Publishing Group, https://opg.optica.org/ao/ abstract.cfm?URI=ao-51-21-5201-2012.
Hu et al. "Local edge distributions for detection of salient structure textures and objects" IEEE Geoscience and Remote Sensing Letters, 10(3):466-470, 2013.
Walvoord et al. "Stabilization and registration of full-motion video data using deep convolutional neural networks" Proceedings vol. 10646, Signal Processing, Sensor/Information Fusion, and Target Recognition XXVII; 1064612 (2018) https://doi.org/10.1117/12.2305072 pp. 11.
Walvoord et al. "Deep learning architecture advancements for accurate and robust image registration" Proceedings vol. 11018, Signal Processing, Sensor/Information Fusion, and Target Recognition XXVIII; 1101812 (2019) pp. 18.
Wang et al.."Application of the directional wavelet transform in edge detection of airfield runway" In 2008 7th World Congress on Intelligent Control and Automation, pp. 9237-9240, 2008.
Xiong et al. "Automatic recognition of airfield runways based on radon transform and hypothesis testing in sar images" In Proceedings of 2012 5th Global Symposium on Millimeter-Waves, pp. 462-465, 2012.
Fu et al. "Airfield runway detection from synthetic aperture radar image" In 2008 Congress on Image and Signal Processing, vol. 4, pp. 798-801, 2008.
Monsoori et al. "Effective airplane detection in high resolution satellite images using yolov3 model" In 2021 4th International Conference on Signal Processing and Information Security (ICSPIS), pp. 57-60, 2021.
Qin et al. "Joint detection of airplane targets based on sar images and optical images" In IGARSS 2019—2019 IEEE International Geoscience and Remote Sensing Symposium, pp. 1366-1369, 2019.
Li et al. "Robust airplane detection in satellite images" In 2011 18th IEEE International Conference on Image Processing, pp. 2821-2824, 2011.
Li et al. "Road network extraction in high-resolution SAR images based CNN features" 2017 IEEE International Geoscience and Remote Sensing Symposium (IGARSS), 2017, pp. 1664-1667, doi: 10.1109/IGARSS.2017.8127293.
Boutarfass et al. "Convolutional autoencoder for discriminating handwriting styles" In 2019 8th European Workshop on Visual Information Processing (EUVIP), pp. 199-204, 2019.

* cited by examiner

FIG. 3
36
GRADIENT PHASE
POSITIVE
NEGATIVE
GRADIENT MAGNITUDE
FILTERED IMAGE

50

OBJECT DETECTION SYSTEM DETERMINING OBJECT BOUNDARY EDGES FROM PENROSE GRADIENT DATA AND RELATED METHODS

TECHNICAL FIELD

The present disclosure relates to image processing, and, more particularly, to objection classification and location from image data and related methods.

BACKGROUND

Image processing is important for several applications, such as medical imaging, objection recognition, and autonomous driving, for example, U.S. Pat. No. 10,937,158 to He et al. discloses a medical image segmentation approach in which an image volume is formed by plural anatomical images each having plural image slices of different imaging modalities that is segmented by a 2D convolutional neural network (CNN). An individual anatomical image is preprocessed to form a mixed-context image by incorporating selected image slices from two adjacent anatomical images without any estimated image slice. The 2D CNN utilizes side information on multi-modal context and 3D spatial context to enhance segmentation accuracy while avoiding segmentation performance degradation due to artifacts in the estimated image slice. The 2D CNN is realized by a BASKET-NET model having plural levels from a highest level to a lowest level. The number of channels in most multichannel feature maps of a level decreases monotonically from the highest level to the lowest level, allowing the highest level to be rich in low-level feature details for assisting finer segmentation of the individual anatomical image.

U.S. Pat. No. 10,467,503 to Kim et al. is directed to an approach for generating an image data set to be used for learning a CNN capable of detecting obstruction in autonomous driving applications. This approach involves generating at least one training data set including steps of: (a) a computing device acquiring (i) an original image and (ii) an initial synthesized label generated by using an original label and a bounding box corresponding to an arbitrary specific object; (b) the computing device supporting a CNN module to generate a first synthesized image and a first synthesized label by using the original image and the initial synthesized label. The first synthesized label is created by adding a specific label to the original label at a location in the original label corresponding to a location of the bounding box in the initial synthesized label, and the first synthesized image is created by adding a specific image to the original image at a location in the original image corresponding to the location of the bounding box in the initial synthesized label.

Another example approach set forth in U.S. Pat. No. 6,259,396 to Pham et al. is directed to a target acquisition system and Radon transform based method for target azimuth aspect estimation. In this approach, a Radon transform is applied to a binary (N×N pixels) target chip to extract target features that are then used to measure length, width, and diagonal features of the target. In parallel, these features are used to estimate the azimuth aspect angle, or size, of the target. The target acquisition system also employs the Radon transform based method for target azimuth aspect estimation.

Despite the existence of such systems, further developments in image processing and object detection systems may be desirable in various applications.

SUMMARY

An object detection system may include a memory and a processor cooperating with the memory to determine gradient data from image data corresponding to a scene, with the scene including an object therein, and process the gradient data using a Penrose transform to generate Penrose gradient data including a plurality of peaks corresponding to the object. The processor may also perform edge filtering on the Penrose gradient data to determine boundary edges corresponding to the object based upon the plurality of peaks, determine a classification of the object based upon the determined boundary edges using an object classification model, and output the object classification.

In an example embodiment, the scene may comprise a geospatial scene, and the processor may be configured to determine a geospatial location of the object from the boundary edges and output the geospatial location with the object classification. In some implementations, the boundary edges may define a centroid point for the object. By way of example, the edge filtering may include a primary edge filtering to determine first boundary edges, and secondary edge filtering to determine second boundary edges smaller than the first boundary edges.

In one implementation, the plurality of peaks may be arranged in symmetrical pairs corresponding to bi-laterally symmetrical portions of the object. Furthermore, in an example embodiment the Penrose transform may comprise a first Penrose transform, and the processor may further process the gradient data using a second Penrose transform based upon generation of a linear signature from the first Penrose transform. By way of example, the gradient data may comprise gradient in-phase and quadrature-phase (GIQ) data, and more particularly GIQ magnitude data.

In some embodiments, the processor may be configured to convert synthetic aperture radar (SAR) data to the image data prior to determining the gradient data therefrom. Furthermore, the object classification model may comprise at least one of a National Imagery Interpretability Rating Scale (NIIRS) model, and an image quality evaluation (IQE) model, for example, which may be used with radar or electro optic (EO) data.

A related object detection method is also provided. The method may include using a processor to determine gradient data from image data corresponding to a scene (with the scene including an object therein), process the gradient data using a Penrose transform to generate Penrose gradient data including a plurality of peaks corresponding to the object, perform edge filtering on the Penrose gradient data to determine boundary edges corresponding to the object based upon the plurality of peaks, determine a classification of the object based upon the determined boundary edges using an object classification model, and output the object classification.

DETAILED DESCRIPTION

The present invention will now be described more fully hereinafter with reference to the accompanying drawings, in which preferred embodiments are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
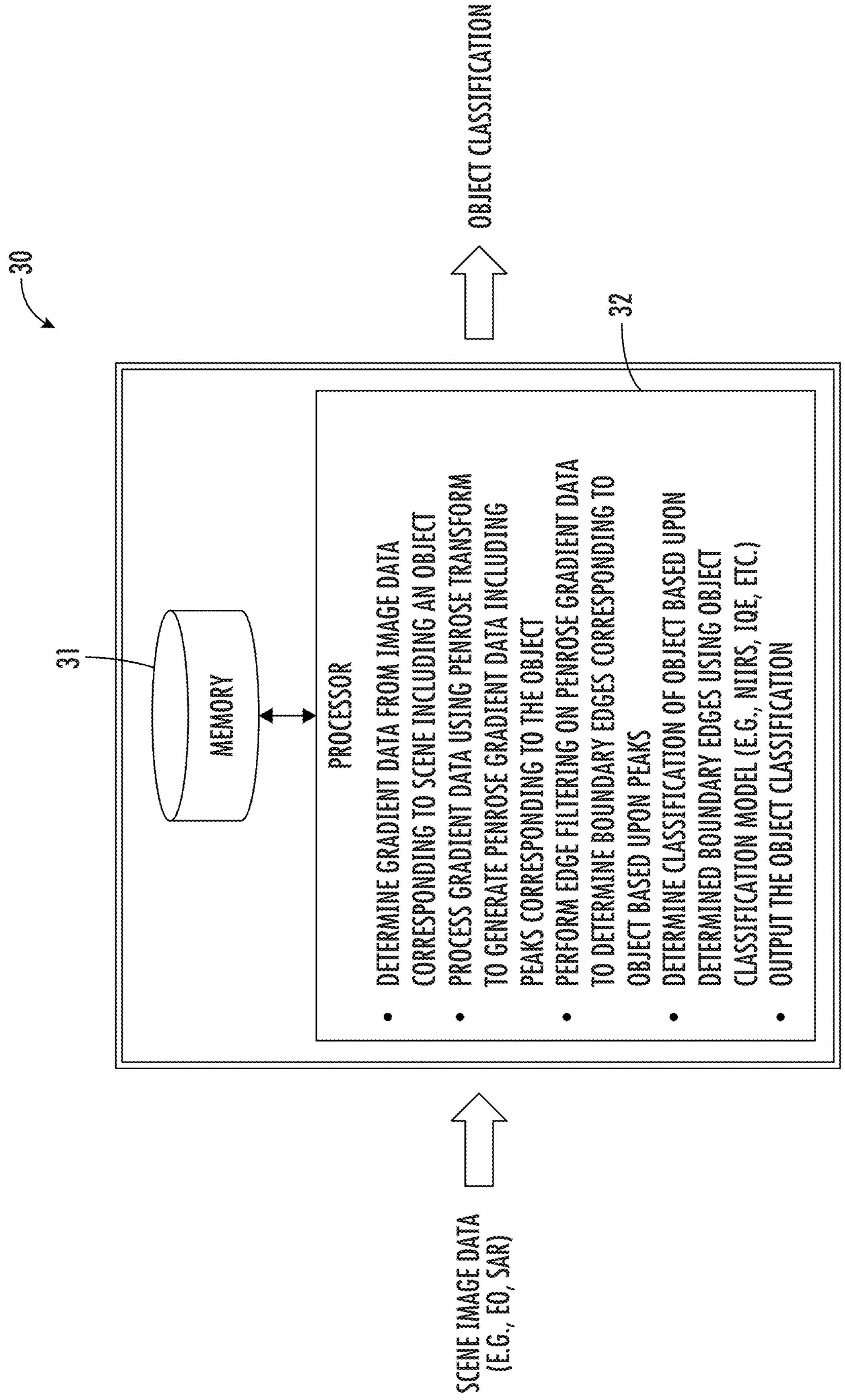
FIG. 1 is a schematic block diagram of an object detection system in accordance with an example embodiment.

Referring initially to FIG. 1, an object detection system 30 illustratively includes a memory 31 and a processor 32 cooperating with the memory to determine gradient data from image data corresponding to a scene, with the scene including an object therein. As will be discussed further below, the processor 32 may process the gradient data using a Penrose transform to generate Penrose gradient data including a plurality of peaks corresponding to the object, perform edge filtering on the Penrose gradient data to determine boundary edges corresponding to the object based upon the plurality of peaks, determine a classification of the object based upon the determined boundary edges using an object classification model, and output the object classification.

By way of background, machine learning (ML) and Artificial Intelligence (AI) technology are continued areas of development. As these developments continue to evolve, there is some evidence that many approaches have started to plateau. In addition, these approaches also are heavily reliant on the consumption of "big data". Since deep learning (DL) CNN solutions often are viewed as "Black Box", "explainability" is often lacking when trying to acknowledge portability to system modifications and improvements. The result is to retrain likely more often than required.

Often DL networks rely on "big data" that requires up to petabytes of cloud data for a single solution. Retraining on larger and larger sets of data as solutions evolve may become intractable and reach a point that data storage and energy consumption are counter to sustainability objectives. Irrespective of sustainability issues, considerations of cloud data storage size and processing time are significant concerns.

To counter these concerns, small data and small model initiatives are of interest. Hence, Light Weight Detectors (LWD)s have been added to research and development (R&D) portfolios to compliment DL approaches and potentially augment performance growth. Complimenting their low memory and processing traits, LWDs are characterized as highly explainable and sustainable approaches, as they link back to physics-based models and engineering experience.

Some approaches utilize template matching to detect and classify via correlation. Likewise, utility of known projection spaces from Fast Fourier Transform (FFT) and Radon transform methods provide efficient algorithms to estimate target features and orientation. However, exploitation of Electro Optical (EO) gradient image data as a complex data format is rarely mentioned. The complex valued analogue of the Radon transform is the Penrose transform. The approach set forth herein allows for the usage of the Penrose transform operating on complex gradient images to provide a state-of-the-art efficient system to detect and estimate target features, simultaneously.

Existing image-based deep-learning CNN approaches are generally effective for unseating most CFAR and case-base detection algorithms. While such approaches may improve target classification performance to record numbers routinely, a significant disadvantage of DL CNN approaches is that they tend to be "black box" methods that lack "explainability" and are not "sustainable" in that retraining and mass amount of data are required to keep them current. Another disadvantage to this approach is that the dataset for training has to be very extensive to capture all possibilities. A robust design is characterized by graceful degradation in performance, that is small perturbations lead to small errors and larger perturbations lead to large error. DL CNNs tend to overfit to outliers, or training data is not sampled in an unbiased sense. DL designs typically incorporate thousands of tunable hyperparameters which takes many training epochs to converge. Retraining cadence methodologies are ad hoc while continuously increasing dataset size.

On the other hand, Radon transform based methods provide for good target shape measurements from extracted binary target masks. However, the disadvantage of this approach is that it is contingent upon prior segmentation, thresholding and morphological operations, which have varying degrees of success depending both on algorithm quality and signal to background conditions.

The present approach may advantageously utilize gradient edges with both Radon and Penrose complex gradient in-phase and quadrature-phase (GIQ) transforms. The Penrose transformation demonstrates edge-to-point (peak) duality, leveraging phase symmetry and coherent integration of similar gradient features. Moreover, the Penrose transformation preserves phase, hence upon peak detection both the edge orientation of a target and its direction, thus+/−180 degrees (low-to-high, high-to-low), and these features may be labeled with no additional processing. This is a significant advantage as typical CNNs require immense training data to achieve every possible aspect under varying conditions (noise, sun angle, etc.).

With respect to GIQ transforms, a typical panchromatic black and white image may be transformed into components of gradient-X, $G_x$, and gradient-Y, $G_y$, images, each representing a respective directional change in the intensity. The gradient of the image is a common perspective utilized in image processing for edge detection. Canny, Prewitt and Sobel filters are examples of commonly used methods that compute the image gradient for edge detection. The gradient components, $G_x$ and $G_y$, in Equation 4.1 & Equation 4.2, are then represented in complex GIQ format as magnitude (GM) and phase ($G_\Theta$) in Equation 4.3 and Equation 4.4, respectively.

$$G_x = \delta_x(I_{xy}) \tag{4.1}$$

$$G_y = \delta_y(I_{xy}) \tag{4.2}$$

Prior to computing the image intensity gradient, it is common to smooth the image with a Gaussian type filter to remove noise existing from edge transitions in images. An edge detection operator returns a value for the first derivative in the horizontal direction, $G_x$ and the vertical direction, $G_y$. From this the edge gradient and direction may be determined:

$$G_M = \sqrt{G_x^2 + G_y^2} \tag{4.3}$$

$$G_\Theta = \tan(G_y, G_x)^{-1} \tag{4.4}$$

As such, GIQ may be expressed as a matrix of complex numbers as follows:

$$G_\delta = G_x + jG_y = G_{M}e^{jG_\Theta} \tag{4.5}$$

The Radon transform of an image may be utilized to gain insight into features and orientation of objects more effectively and efficiently than techniques that more directly exploit an image in native format. The Radon transformation involves the mapping of an image from Cartesian to polar coordinates R(ρ,θ) as noted with Equation 4.6 below. This mapping allows for the conversion of a target image f(x,y) that exists within a 2D plane to be converted to a 2D projection graph for analysis.

$$R_I(\theta, \rho) = \int_{-\infty}^{+\infty}\int_{-\infty}^{+\infty} I(x, y)\delta(x\cos\theta + y\sin\theta)dxdy \tag{4.6}$$

An array of evenly spaced projections slice through the target image. These projections are perpendicular to the polar coordinate length vector ρ and systematically rotate about the image center. Information gathered during rotation is collected at varying degree intervals of θn. These projections create image slices in the intersections that take place amongst the projection array and target image f(x,y). The information derived from each image slice makes it possible for the return of the Radon transformation. Integration along the image slices returns a summation of pixels associated with a particular projection instance. The line integral evaluation or pixel summation of the image slices are responsible for the formation of various peaks in the Radon Transformation visual.

The Radon transform is often applied in medical imaging such as for Computer-Aided Tomography (CAT) scans. For this application, the inverse Radon transform is utilized to reconstruct an image via back projection. The Radon transform performs the integral transform which takes a function defined on the plane to a function defined on the 2D space of lines in the plane.

The main purpose of using a radon transformation is to extract critical features representative of the original image in a compact and robust manner, thus minimizing information entropy. Radon transform of an image I(x,y) for a given set of angles can be computed by calculating the projections of the image along the given angles. Basically, the Radon transform maps from the Cartesian rectangular coordinates to polar coordinates R(θ,ρ), where ρ is the smallest distance from the origin and θ is its angle with the x-axis. The resulting projection is the sum of the intensities of the pixels in each direction. The coordinates f(x,y) of a point in the projection is just the line integral of Equation 4.6 above, where δ(.) is the Dirac delta function, δ(x)=1, if x=0 and 0 otherwise. Each value at a particular line is equal to the line integral of the function over that line. It can also be generalized to higher-dimensional Euclidean spaces, where it is widely applied to tomography.

Many image exploitation algorithms leverage the image gradient to exploit object features. It should be noted that this is different to human image exploitation as we are equipped with a pair of eyes that saccade swiftly back and forth. Thus, these mechanisms imply that our visual system is well equipped to detect the gradient aspects of a scene. As such, the Radon projection of gradient magnitude may be used as basis from which to exploit features more effectively and efficiently than that of the same projection of the image intensity.

Now, consider that when only projecting the gradient magnitude information, we discard the phase information. Hence, to project the complex GIQ data, joining both phase and magnitude simultaneously, we seek to investigate the Penrose transform. The Penrose transform is a complex analog of the Radon transform where instead of a real function defined across a plane, the input relates to a complex valued field. Hence, the Penrose transform projects onto a complex space. By analogy, whereas the points of a real projective space label the lines through the origin of a real Euclidean space, the points of a complex projective space label the complex lines through the origin of a complex Euclidean space. Formally, a complex projective space is the space of complex lines through the origin of an (n+1)-dimensional complex vector space. When n=1, the complex projective space, $CP_1$, is a Riemann Sphere.

In mathematics, the Riemann Sphere is a model of the extended complex plane, the complex plane plus a point at infinity. This extended plane represents the extended complex numbers, that is, the complex numbers plus a value ∞ for infinity. With the Riemann model, the point, ∞, is near to very large numbers, just as the point "0" is near to very small numbers. The extended complex numbers are useful in complex analysis because they allow for division by zero in some circumstances, in a way that makes expressions such as $$\frac{1}{0} = \infty$$

well-behaved.

For example, any rational function on the complex plane can be extended to a holomorphic function on the Riemann Sphere, with the poles of the rational function mapping to infinity. In geometry, the Riemann Sphere is the prototypical example of a Riemann surface which is one of the simplest complex manifolds. In projective geometry, the sphere can be thought of as the complex projective line derived from a single direction of the Penrose transform or the projective space of all complex lines.

The Penrose transform integrates complex samples at a given projection angle, $\theta_i$. Thus, the projection complex projection vector, $$\vec{p}_\theta,$$

is the composite of samples that are the resultant of parallel line integrals lines across the image field space. Restated, each complex sample in $$\vec{p}_\theta$$

is the summation of all the samples intersecting with a Penrose projection line.

Of significance to the coherence property, the input image field includes complex gradient GIQ samples derived from a real-valued image of interest. GIQ data highlights edge features with large gradient magnitudes and directional phase vectors. Since the Penrose projection, θ, introduces line integrals parallel to the edge features embedded in GIQ, the Penrose transform coherently integrates complex samples derived from a common edge. This is a very significant observation, as coherent integration preserves the phase relationship between complex samples, thus a significant build up in signal amplitude is achieved for edges creating an overall edge magnitude or power.

Alternatively, the Radon transform where the phase relation is not available is called non-coherent integration. A perfect integrator is 100% efficient. Hence, if an edge length is increased by Ns samples, the signal-to-noise ratio (SNR) would increase by the same factor. Otherwise, integration loss occurs which is always the case with a non-coherent integrator.

Figure 2:
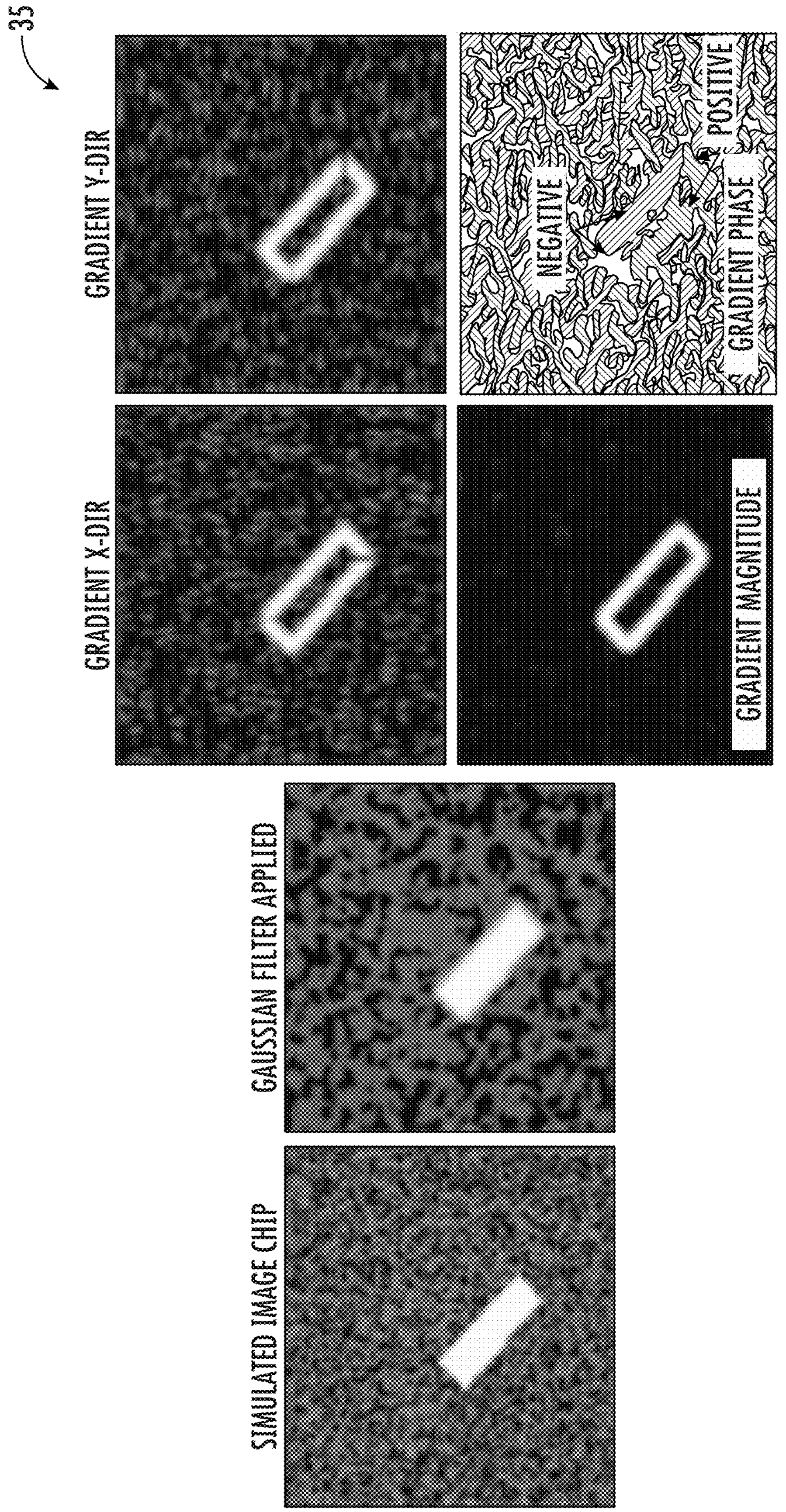
FIG. 2 is a series of image and gradient data representations illustrating a process for computing gradient in-phase and quadrature-phase (GIQ) data in an example embodiment.
Figure 3:
FIG. 3 is a series of image, magnitude and gradient data representations illustrating the process of FIG. 2 applied to a semi-truck.

Turning to the diagrams 35 and 36 of FIGS. 2 and 3, the transition of a panchromatic image or image mask into the complex GIQ data components is now described. Edge gradients are easily skewed by noise, thus smoothing the Target-Like Object (TLO) (e.g., manmade object(s) of interest in the imaged scene) or background edge transitions helps keep adjacent gradient samples to maintain similarity when part of the same edge transition. To smooth the image, a Gaussian filter kernel may be convolved with the image. Gaussian filters are generally isotropic providing the same performance standard deviation across each dimension.

Each of the 4 perspectives for gradient filtering (gradient-X, gradient-Y, gradient magnitude, and gradient phase) are shown in FIG. 2. The TLO edges are apparent for the simulated TLO in each of the four views displayed in FIG. 3. The phase gradient perspective is displayed depicting the positive slope and negative slope as indicated. The gradient phase features are uniquely preserved after projection with the Penrose transform. It will be appreciated that a rectangular TLO can be characterized by two edge pairs that are orthogonal to each other.

Figure 4:
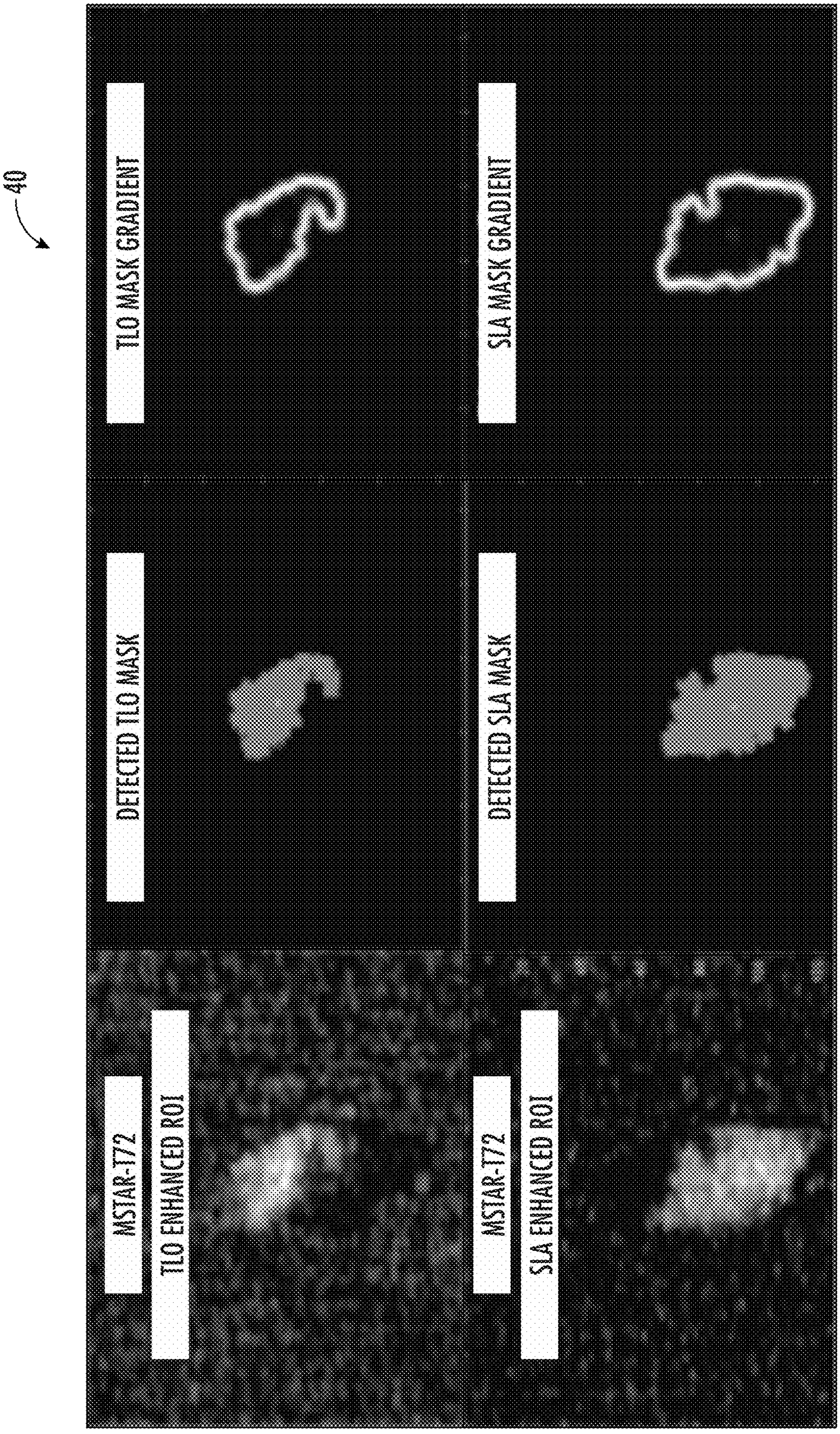
FIG. 4 is a series of image gradient data representations for different gradient masks which may be used in various embodiments.

Referring additionally to the diagram 40 of FIG. 4, SAR targets do not manifest well using gradient processing on the detected image data due to the likelihood of TLOs possessing adjacent Integrated Point Response (IPR) filters that create continuous edge features. Shadow-like Areas (SLAs) also lack continuity from leakage of multiplicative noise from adjacent target scatterers and clutter. These dynamic intensity fluctuations are abrupt even after smoothing filters, thus reducing the image's useful gradient information. However, post-detection and mask discrimination processing where uniformity is labeled in binary form, the Penrose GIQ information is viable to extract features including pose and size estimation as can be seen in FIG. 4. Tables 1 and 2 provide example lists of inputs and outputs for preprocessing and computing GIQ image data.

TABLE 1

Inputs for Preprocessing and Computing GIQ Data

| Symbol | Description | Units | Range | Notes |
|---|---|---|---|---|
| IDET | Image Intensity | 2D pixel array | I ϵ [0; 255] | [Nr; Nc] |
| fName | filename | string | ASCII | optional |
| [b] | x-axis CDF plot | string | ASCII | optional |

TABLE 2

GIQ Data Outputs

| Symbol | Description | Units | Range | Notes |
|---|---|---|---|---|
| Nr | number of rows | integer | I ϵ [32; 256] | |

TABLE 2-continued

| GIQ Data Outputs | | | | |
|---|---|---|---|---|
| Symbol | Description | Units | Range | Notes |
| Nc | number of columns | integer | I ∈ [32; 256] | |
| Gx | Image Gradient-$\vec{X}$ | 2D gradient array (δIx) | R ∈ [−255; 255] | [Nr; Nc], Equation 4.1 |
| Gy | Image Gradient-$\vec{Y}$ | 2D gradient array (δIy) | R ∈ [−255; 255] | [Nr; Nc], Equation 4,2 |
| GM | Image Gradient-\|M\| | 2D pixel intensity | R ∈ [0; 361] | [Nr; Nc], Equation 4.3 |
| $G_\theta$ | Image Gradient-Angle | 2D array, radians | R ∈ [−π; π] | [Nr; Nc], Equation 4.4 |
| $G\tilde{c}$ | Complex Image GIQ | 2D complex pixel array | R; Im ∈ [−255; 255] | [Nr; Nc], Equation 4.5 |

The following is example MATLAB code for computing a GIQ component dataset:

%% main: [IG,t]=plotEO_MGradientSet(ID,IB,F,fName, fPath), ver2.0

```
IG.ID = imgaussfilt(ID, F);
[IG.M, ID.dir] = imgradient(IG.ID);
IG.M = IG.M.*(IB == 0);
[IG.x, IG.y] - imgradicntxy(IG.ID);
IG.C = IG.x + li*IG.y;
IG.C = IG.C.*(IB == 0);
```

Figure 5:
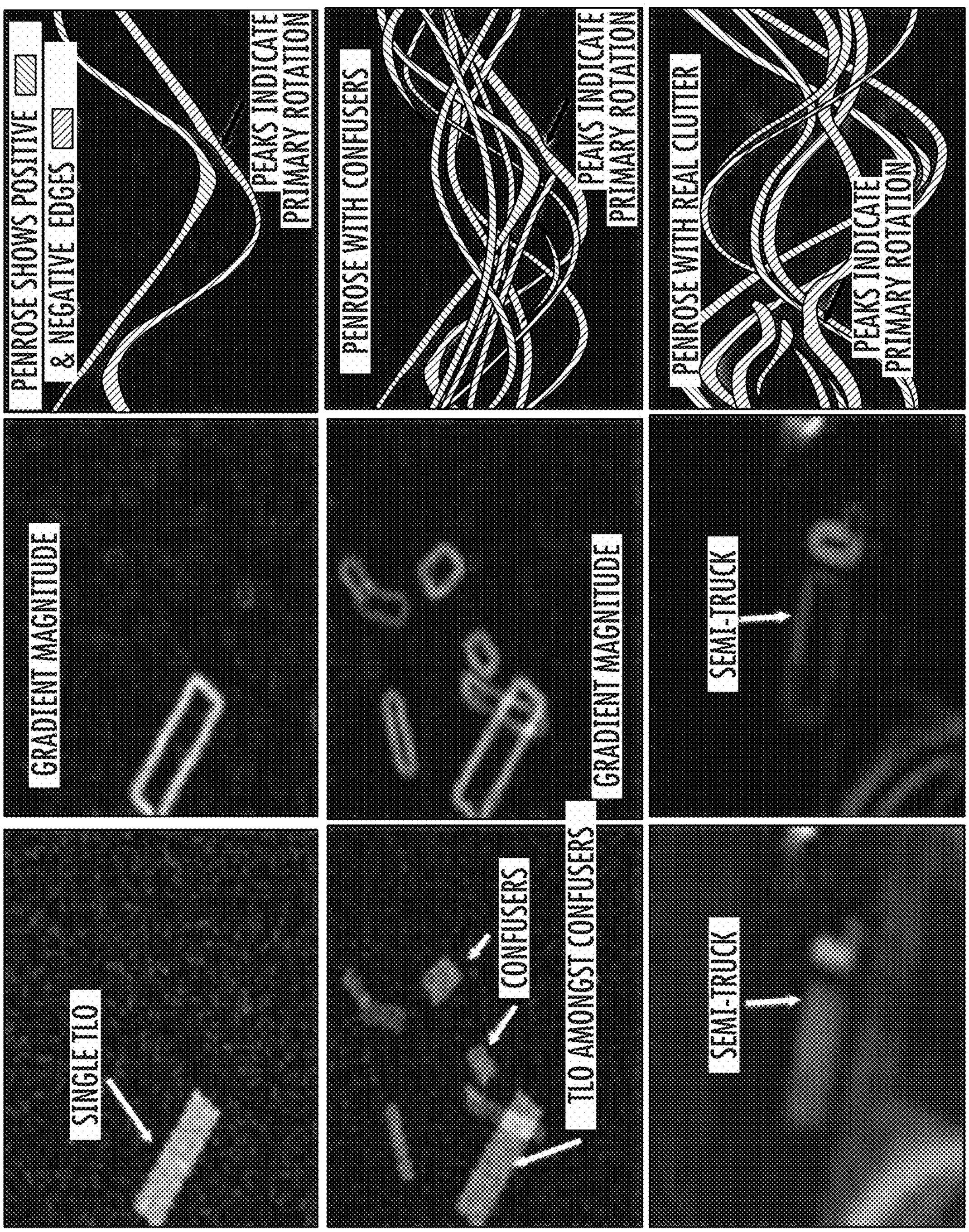
FIG. 5 is a series of image, magnitude and gradient data representations illustrating direction transforms using a Penrose transform in an example embodiment.
Figure 6:
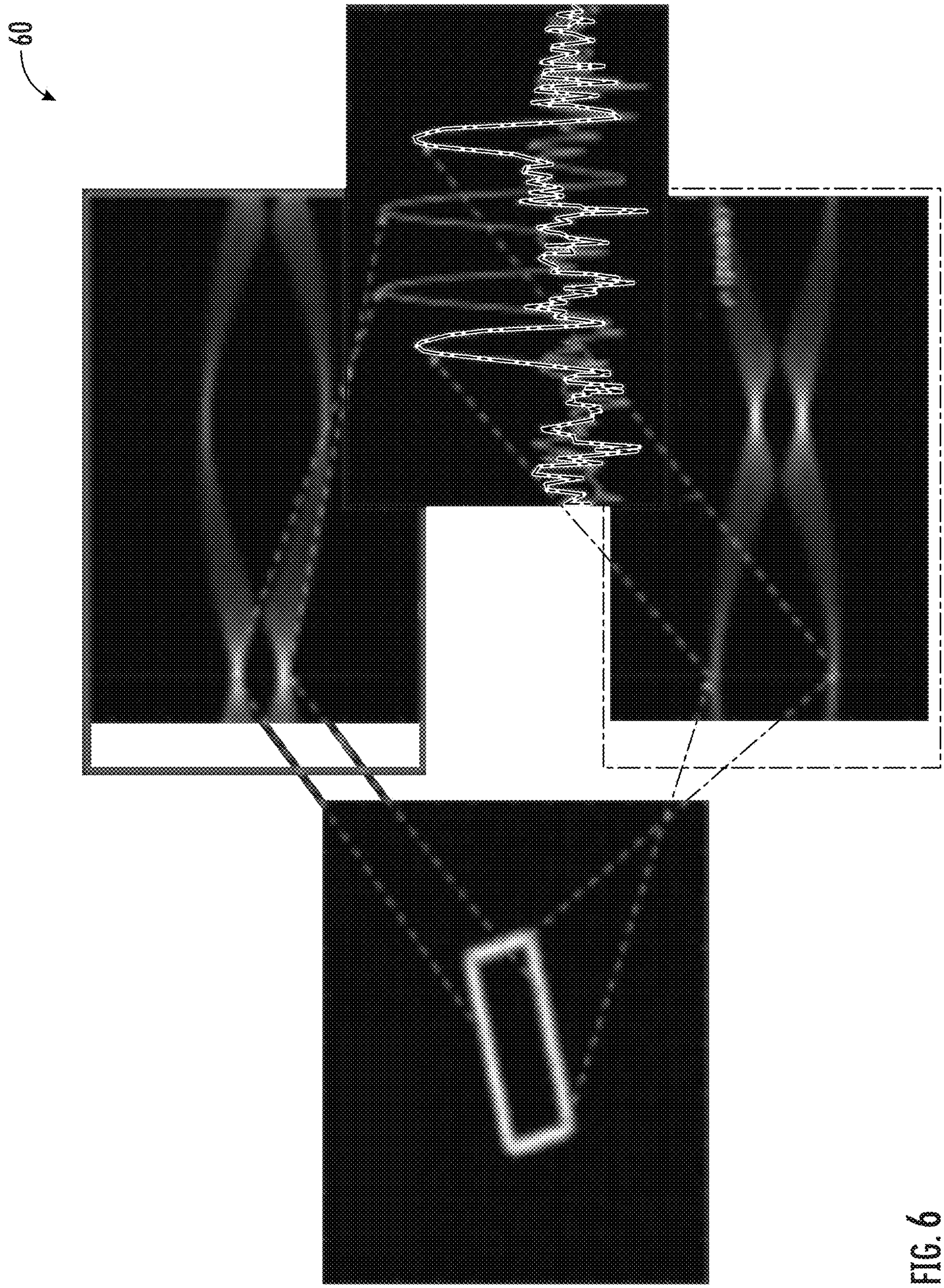
FIG. 6 is a series of gradient image and Penrose projection representations in an example embodiment.

Tuning now to the diagrams 50 and 60 of FIGS. 5 and 6, computation of Penrose transforms is further discussed. The application of the Penrose transform imports and processes complex GIQ previously generated from input image intensity data. This transform thereby integrates complex samples parallel to the specified rotations. Resultant complex profiles, $$\vec{p}_{\theta i},$$

possess the response from constructive and destructive interference induced by the superposition of complex samples the respective projection direction, θ.

The magnitude-phase relationship inherent to a GIQ product preserves the directional feature of prominent image edges. Rectangular TLOs are constructed of two pairs of rising edges that are coupled to the respective parallel falling edge. Each pair of parallel edges of a TLO is orthogonal to the other.

Once again, each Penrose projection integrates complex samples in the prescribed direction. When the projection matches the orientation of the primary axis, the off-axis edge pair destructively interferes being that their respective complex edge samples are 180 degrees out of phase from each other. Coupled with the canceling off-axis power, the primary on-axis edge complex samples are coherently aligned, resulting in constructive addition and resultant peak features shown in FIG. 6.

This module computes three separate projections at each specified angle. Foremost, the Radon transform derives from the GIQ magnitude only data. The Radon resultant, RM, is used for baseline comparison and troubleshooting, it is not required beyond this verification purposes. Nevertheless, it is useful to observe the differences between the Penrose and Radon resultants to appreciate the advantages of the Penrose vs. the Radon, as well as the difference between coherent and non-coherent integration (NCI).

Next, a Penrose projection operates on the complex GIQ data for each angle between $$90 - \frac{N_\theta}{2}$$

and $$270 + \frac{N_\theta}{2}$$

degrees. $N_\theta$ references the $\Delta\theta_i$ component of the array manifold. Each $\theta_i$ provides a snapshot realization as part of of sampling input to the beamforming operation. This projection is $$P_{\tilde{c}},$$

the co-aligned orientation of the projection which extracts parallel edges.

Finally, a Penrose projection that operates on the complex GIQ data for each angle between $$180 - \frac{N_\theta}{2}$$

and $$360 + \frac{N_\theta}{2}$$

degrees. This projection is $$P_{\tilde{x}},$$

the cross-aligned orientation of the projection which extracts perpendicular edges. Example MATLAB code for computing Penrose projection components is as follows:

%% main: [PG,RG]=computePenroseComponents (IG, Ntheta,fPath), ver2.8

$$PG.Theta = [0 - Ntheta{:}180 + Ntheta];$$

$$PG.ThetaX = PG.Theta + 90;$$

$$RG.M = radon(\text{abs}(IG.C), PG.Theta);$$

$$PG.C = radon(IG.C, PG.Theta);$$

$$PG.X = radon(IG.C, PG.ThetaX);$$

Table 3 below provides a list of example user parameters which may be used to execute the Penrose algorithm. These parameters may be adjusted to impact algorithm operation and performance. These parameters include the min and max size of the TLO to detect and measure as well as the input image Ground Sample Distance (GSD) and sampling ratio (SR). Additionally, Penrose peak filtering and manifold definition parameters are defined.

TABLE 3

User Parameter Input Structure, $p_{input}$, for Penrose Processing

| Symbol | Description | Units | Range | Notes |
|---|---|---|---|---|
| $[L_{min}, L_{max}]$ | Min, Max TLO length | m | $\mathbb{R} \in [1, 100]$ | |
| $[W_{min}, W_{max}]$ | Min, Max TLO width | m | $\mathbb{R} \in [1, 100]$ | |
| $\delta x$, $\delta y$ | GSD in col, row dir | m | $\mathbb{R} \in [.1, 10]$ | |
| SR | Sampling Ratio | | $\mathbb{R} \in [0, 10]$ | |
| $\delta_{\Theta}$ | Angular Width | degrees | $\mathbb{R} \in [0, 20]$ | |
| $[\delta\rho_{min}, \delta\rho_{max}]$ | min, max edge peak width | samples | $\mathbb{R} \in [1, 15)$ | |
| $N_{\rho}$ | manifold snapshots | count | $\| \in [1, 15]$ | |
| $N_{\Theta}$ | manifold elements | count | $\| \in [1,15]$ | |
| $N_{xy}$ | manifold snapshots | count | $\| \in [1,15]$ | |
| $[N_{e_x}, N_{e_y}]$ | max postulate edges x,y-dir | count | $\| \in [1, 15]$ | |
| $H_f$ | Convolution Filter | 2D array | $\mathbb{R} \in [0, \inf]$ | $[n_{\rho}, n_{\Theta}]$, |

Tables 4 and 5 below provide example lists of inputs and outputs for preprocessing and computing the GIQ image data.

TABLE 4

Inputs for Penrose Transform

| Symbol | Description | Units | Range | Notes |
|---|---|---|---|---|
| $[\Theta_{min}, \Theta_{max}]$ | min, max projection angle | degrees | $\| \in [0, 359]$ | padded projections |
| $G_M$ | Image Gradient-[M] | 2D pixel array | $\mathbb{R} \in [0, 359]$ | optional |
| $\mathbb{G}_{\tilde{c}}$ | Complex Image $G_{IQ}$ | 2D complex pixel array | $\mathbb{R}, \|m \in |-255, 255]$ | $[N_r, N_c]$, Equation 4.5 $[N_r, N_c]$, |
| $I_{MASK}$ | color mask | 2D binary array | $\| \in [0, 1]$ | |

TABLE 5

Penrose Transform Outputs

| Symbol | Description | Units | Range | Notes |
|---|---|---|---|---|
| $N_{\rho}$ | number of projection samples | integer | $\| \in [x, x]$ | |
| $N_{\Theta}$ | number of angle projections | integer | $\| \in [x, x]$ | |
| $P_{\tilde{c}+}$ | Co-Axis + $\delta p$ filtered projection | 2D complex pixel array | $\mathbb{R}, \|m \in$ | $N_{\rho} \times N_{\Theta}$ |
| $P_{\tilde{c}-}$ | Co-Axis − $\delta P$ filtered projection | 2D complex pixel array | $\mathbb{R}, \|m \in$ | $N_{\rho} \times N_{\Theta}$ |
| $P_{\tilde{x}+}$ | X-Axis + $\delta p$ filtered projection | 2D complex pixel array | $\mathbb{R}, \|m \in$ | $N_{\rho} \times N_{\Theta}$ |
| $P_{\tilde{x}-}$ | X-Axis - $\delta p$ filtered projection | 2D complex pixel array | $\mathbb{R}, \|m \in$ | $N_{\rho} \times N_{\Theta}$ |
| $P_{\tilde{c}}$ | Penrose projection co-axis | 2D complex pixel array | $\mathbb{R}, \|m \in$ | $N_{\rho} \times N_{\Theta}$ |
| $P_{\tilde{x}}$ | Penrose projection X-axis | 2D complex pixel array | $\mathbb{R}, \|m \in$ | $N_{\rho} \times N_{\Theta}$ |
| $\tilde{P}_{M}$ | Penrose \|M\| | 2D array | $\mathbb{R} \in |0,\inf|$ | $N_{\rho} \times N_{\Theta}$ |

Figure 7:
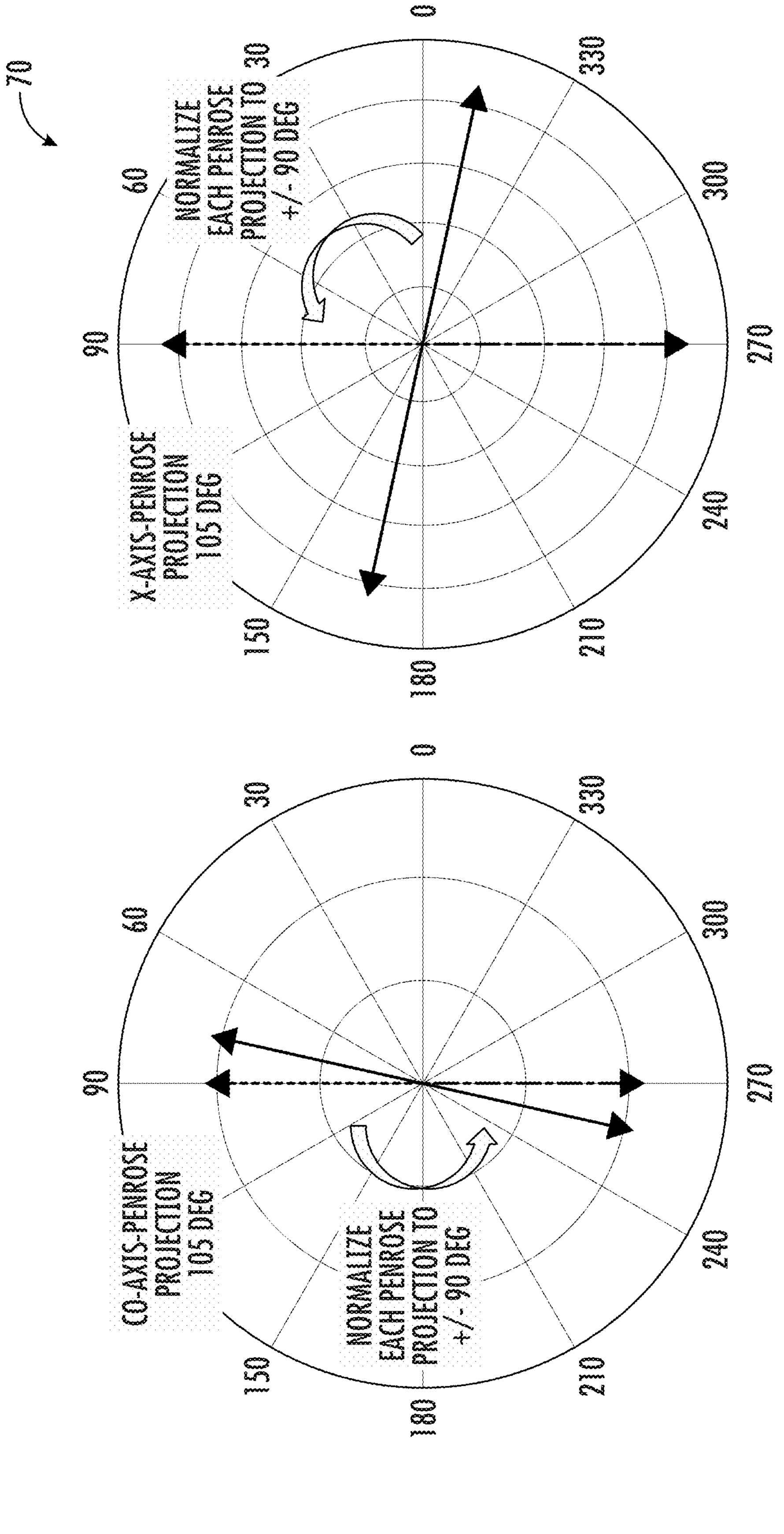
FIG. 7 is a series of co-axis and x-axis Penrose projections in an example embodiment.

Referring additionally to the diagram 70 of FIG. 7, subsequent to the Penrose transform, both the co-axis and X-axis Penrose projection sets are decomposed into gradient-directional resultant profiles. Parallel edges of a TLO are characterized by peak magnitude responses that possess phase components that are 180 degrees out-of-phase to each other. Filtering is accomplished by rotating each respective complex sample by reversing or rotating the orientation of the projection so it is normalized to the imaginary ± 90 axis as shown. This positions the phase of the edge gradients parallel to the projection about the real axis. Based on whether the resultant phase is positive or negative the data is split into a positive, $$P_{\tilde{c}+},$$

and negative, $$P_{\tilde{c}-},$$

Penrose co-axis projection profile set. Likewise, the positive, $$P_{\tilde{x}+},$$

and negative, $$P_{\tilde{x}-},$$

Penrose X-axis projection profile set is created as set forth in equations 4.7-4.10, in which $$\vec{\theta}_{\vec{c}}$$

is between $$1-\frac{N_\theta}{2}$$

and $$180+\frac{N_\theta}{2}$$

in degrees for sampling and is converted to radians for computation.

$$P\tilde{c}_+ = P\tilde{c} \odot \left[P\tilde{c}\left(\angle\left[e^{j\left(\frac{\pi}{2}-\vec{\theta}_{\vec{c}}\right)}\right] > 0\right)\right]; \quad (4.7)$$

$$P\tilde{c}_- = P\tilde{c} \odot \left[P\tilde{c}\left(\angle\left[e^{j\left(\frac{\pi}{2}-\vec{\theta}_{\vec{c}}\right)}\right] \leq 0\right)\right]; \quad (4.8)$$

$$P\tilde{x}_+ = P\tilde{x} \odot \left[P\tilde{x}\left(\angle\left[e^{j\left(\pi-\vec{\theta}_{\vec{c}}\right)}\right] > 0\right)\right]; \quad (4.9)$$

$$P\tilde{x}_- = P\tilde{x} \odot \left[P\tilde{x}\left(\angle\left[e^{j\left(\pi-\vec{\theta}_{\vec{c}}\right)}\right] > 0\right)\right]; \quad (4.10)$$

The following is example MATLAB code for filter Penrose directional components:

```
% main: PG=filterGradientDir(PG,dA,sA,Display,fPath), ver4.0 Nr=size(PG.C,1);
CpTemp=PG.C.*repmat(exp(sign(sA)*1i*deg2 rad(abs(sA)-1+PG.Theta)),Nr,1);
PG.Cp=PG.C.*(abs(angle(CpTemp))<deg2 rad(dA));
CnTemp=PG.C.*repmat(exp(sign(sA)*1i*deg2 rad(abs(sA)-1+PG.Theta+180)),Nr,1);
PG.Cn=PG.C.*(abs(angle(CnTemp))<deg2 rad(dA));
XpTemp=PG.X.*repmat(exp(sign(sA)*1i*(abs(sA)-1+PG.Theta+90)*pi/180),Nr, 1);
PG.Xp=PG.X.*(abs(angle(XpTemp))<deg2 rad(dA));
XnTemp=PG.X.*repmat(exp(sign(sA)*1i*(abs(sA)-1+PG.Theta+90+180)*pi/180),Nr,1);
PG.Xn=PG.X.*(abs(angle(XnTemp))<deg2 rad(dA));
```

Table 6 provides example Penrose transform directional gradient filter inputs, and table 7 provides example Penrose transform directional gradient filter outputs.

TABLE 6

| Penrose Transform Directional Gradient Filter Inputs | | | | |
|---|---|---|---|---|
| Symbol | Description | Units | Range | Notes |
| $P\tilde{c}$ | Penrose projection co-axis | 2D complex pixel array | R, Im ∈ [−, +] | $N_\rho x N_\theta$ |
| $P\tilde{x}$ | Penrose projection co-axis | 2D complex pixel array | R, Im ∈ [−, +] | $N_\rho x N_\theta$ |

TABLE 7

| Penrose Transform Directional Gradient Filter Outputs | | | | |
|---|---|---|---|---|
| Symbol | Description | Units | Range | Notes |
| $P\tilde{c}_{\shortmid}$ | Co-Axis + projection | 2D complex pixel array | R, Im ∈ [−, +] | $N_\rho x N_\theta$ |
| $P\tilde{c}_-$ | Co-Axis - projection | 2D complex pixel array | R, Im ∈ [−, +] | $N_\rho x N_\theta$ |
| $P\tilde{x}_+$ | X-Axis + projection | 2D complex pixel array | R, Im ∈ [−, +] | $N_\rho x N_\theta$ |
| $P\tilde{x}$ | X-Axis - projection | 2D complex pixel array | R, Im ∈ [−, +] | $N_\rho x N_\theta$ |

Figure 8:
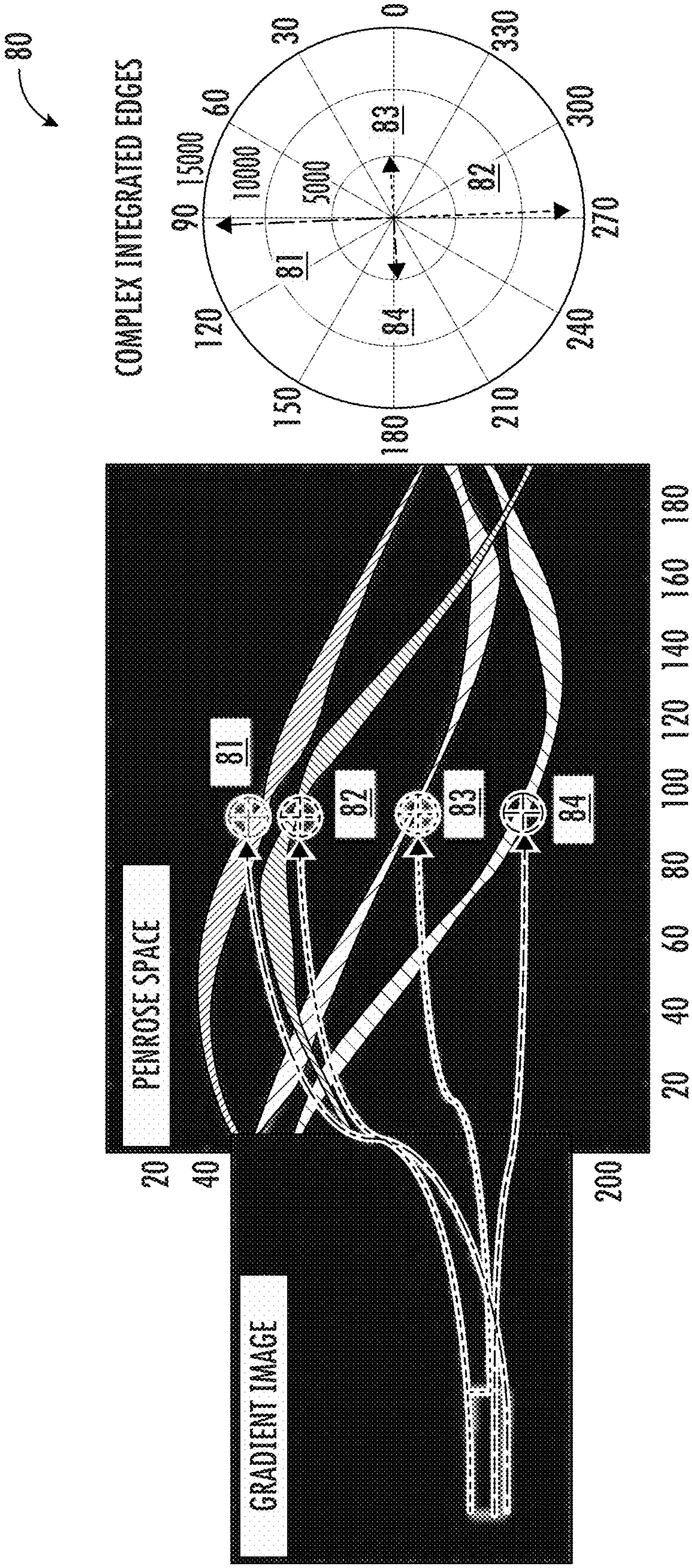
FIG. 8 is a series of gradient image and Penrose space diagrams illustrating a Penrose edge symmetry filter approach in an example embodiment.

Referring now to the diagram 80 of FIG. 8, the TLO of interest is a 4-sided rectangular object. From an elevated vantage point, the projection is assumed to be symmetrically rectangle in image space. Various vantage and look angles perturb rectangles into parallelograms and cast adjacent shadow signatures. For clarity of explanation, we ignore the effects of light variation and shadowing. However, the analysis may anticipate these slight variations of the parallel and orthogonal angles. Thus, the present approach expects a desired TLO to be described by two sets of approximately parallel edges that are approximately perpendicular. A resulting gradient image decomposes a TLO into two pairs of symmetric edges approximately 180° from each other. In FIG. 8, the TLOW has a pair of long edges 81, 82 and an orthogonal pair of short edges 83, 84. Each pair of point responses in Penrose space (center of FIG. 8) align in projection angle with corresponding separation of width and length, respectively. The compass view on the right demonstrates that each parallel edge gradient field is shown to be 180° from each other.

The objective of the Penrose parallel edge symmetry filter is to exploit the presence of these symmetric features in the Penrose space. Gradient field symmetry in combination with line-to-point response compression simplifies the process for combining the gradient intensity for each edge. The filter design coherently combines each pair of point responses utilizing the a priori approximate TLO width and length, as seen in diagrams 90 and 100 of FIGS. 9 and 10. Again, since the gradient phase is preserved in each projected Penrose complex sample, P(θ,ρ), projection phase adjusting and conjugate phase match provide a coherent summation that maximizes pair edge response. In this sense, we have imposed another duality for each detected paired line response transforming into a point response for conjugate parallel edges in Penrose space.

Figure 9:
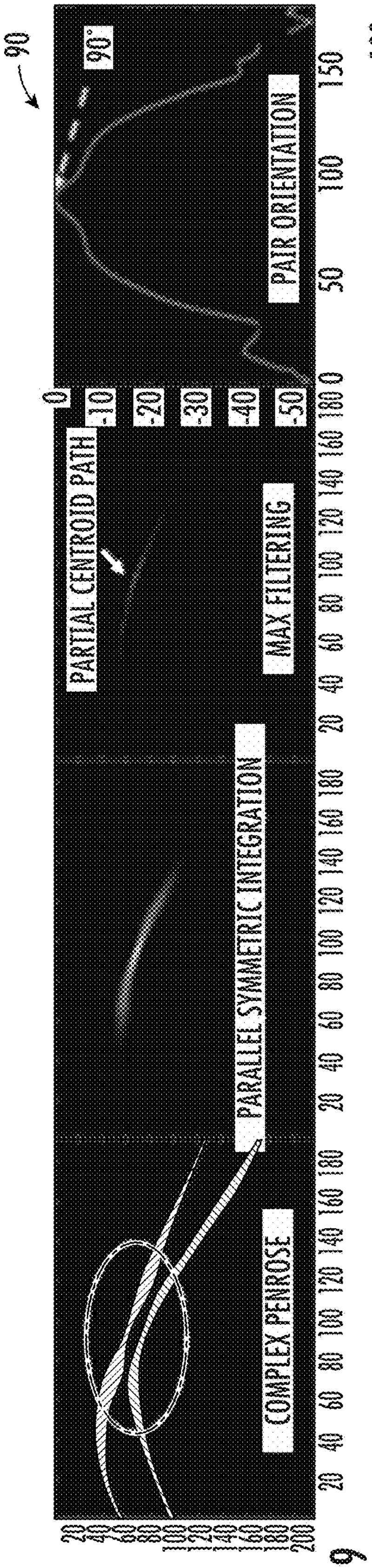
FIG. 9 is a series of representations illustrating a coherent integration of Penrose signature of parallel primary features in an example embodiment.

As shown in FIG. 9, the transfer of detected energy from the primary edge responses to a combined centroid response in the second image that couples the primary edge profile until the separation exceeds the filter's TLO width constraint. The maximum of this response is plotted in Penrose space and by maximum relative power in the plot on the far right. In this case, the detected orientation of the TLO is at 90°. Also, note that the signature from the edges lengthwise is prominent as related rotation projection angle $$90° \pm \tan^{-1}\left(\frac{L}{W}\right).$$

Figure 10:
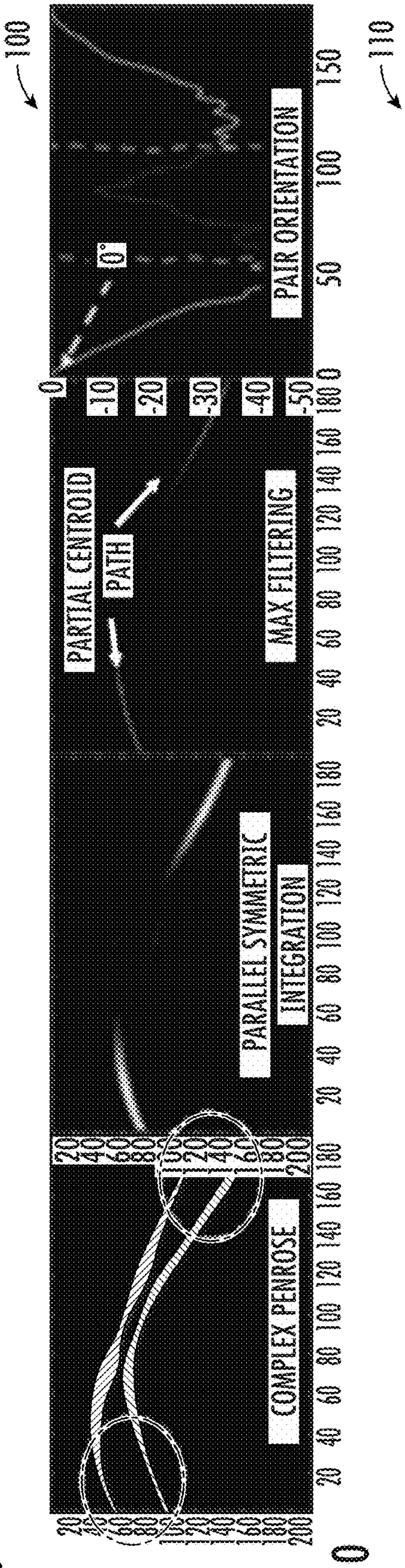
FIG. 10 is a series of representations illustrating a coherent integration of Penrose signature of parallel secondary features for the example of FIG. 9.

Since it is known that the maximum of the widthwise signature should have a maximum approximately 90° from the primary signature orientation, we only need to consider the response outside of $$90° \pm \tan^{-1}\left(\frac{L}{W}\right),$$

the primary lengthwise orientation as depicted in FIG. 10. Here, the maximum occurs at 0° then fades on both sides as the signature wraps around to 180°.

Figure 11:
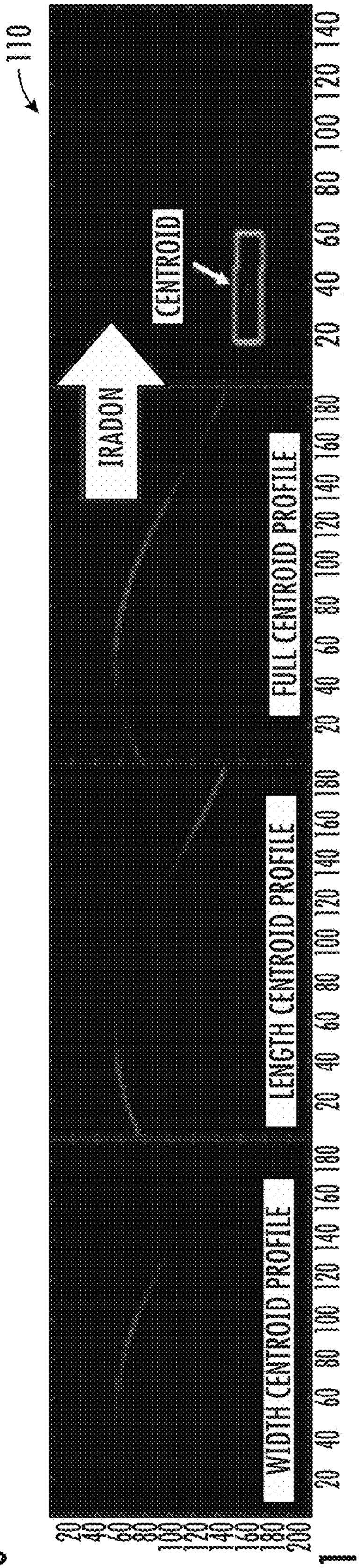
FIG. 11 is series of representations illustrating combined Penrose width and length signature-to-object point response in an example embodiment.

Referring additionally to the diagram 110 of FIG. 11, we investigate the inverse Radon transform of the centroid intensity for each of the filtered Penrose signatures. In all cases the resultant inverse lands a response signature that matches the centroid of the rectangular TLO under investigation. In each case the response matches the derived parallel edge signature axis of orientation. This demonstrates that the centroid point signature passes between the signature of each pair of parallel lines. Hence, a fully resolved point signature from all edge signatures integrates the inverse of the centroid to a point back in image space, as seen in FIG. 11.

This final response is notable since the combined edge response signature is compressed into an impulse response positioned at the centroid of the TLO. Complimenting this result are Penrose IPRs that identify the line equations in polar coordinates for each line as well as the orientation and spacing for each line pair. Moreover, each Penrose signature relates back to the spatial reference frame with Fourier slice theorem. Therefore, additional adaptive processing may be introduced to increase signature accuracy by doing a filtered 1D-Fast Fourier Transform (1D-FFT) to create an array manifold, i.e., additional adaptive processing that can separate closely spaced signatures.

Figure 12:
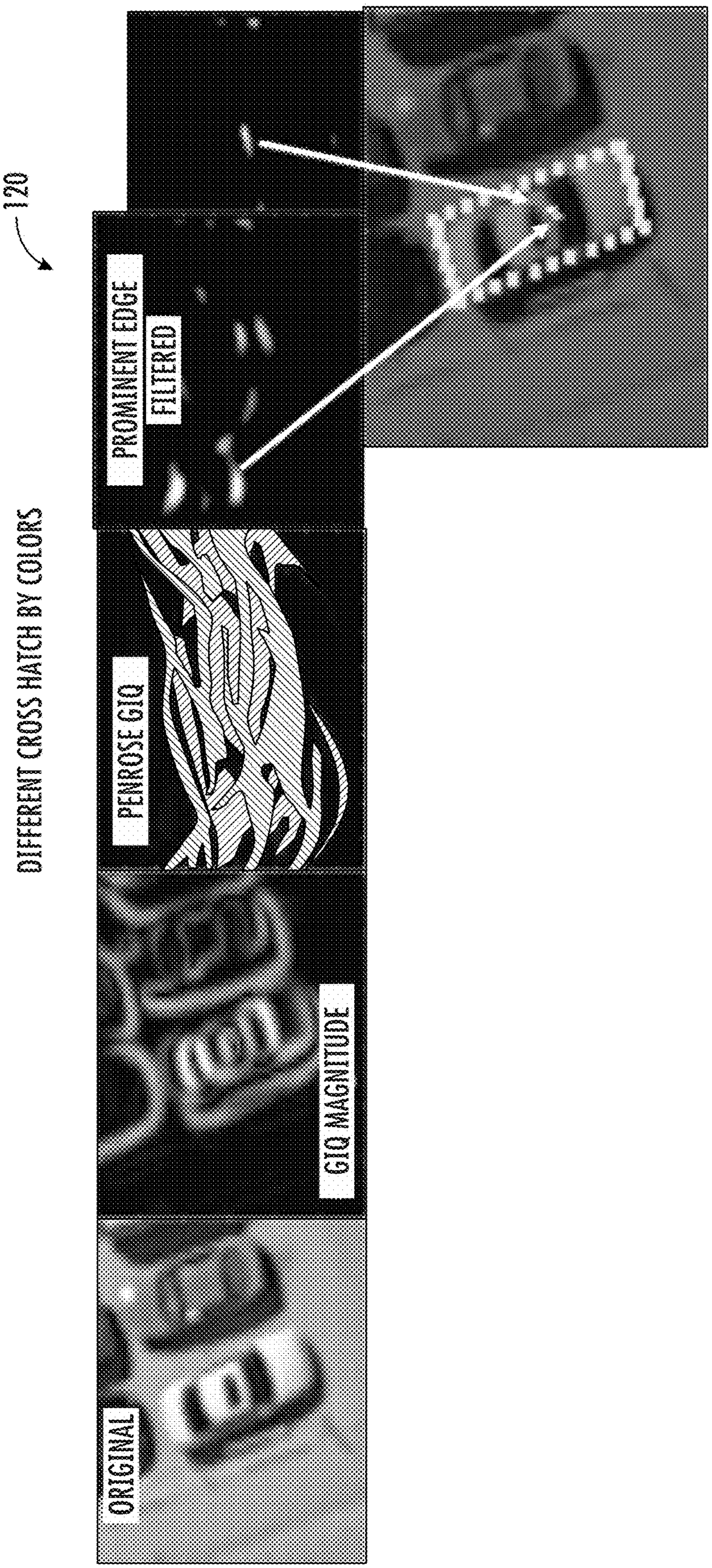
FIG. 12 is a series of image and gradient data representations illustrating object detection operations in an example embodiment where the object is a passenger vehicle.

The system 30 may employ the above-described Penrose transformation and filtering techniques in a variety of scenarios for object detection and recognition, examples of which will now be described. Turning to the diagram 120 of FIG. 12, an example passenger vehicle detection scenario is shown. In the original optical image, intensity provides only a partial descriptor for vehicle detection, while the optimal threshold determination is not straight forward. The GIQ magnitude data for the image includes both low and highlight intensity variations, but does not indicate clear intensity or angle threshold. The Penrose GIQ data highlights at least two sides of the car as prominent as SNR ~40 dB, and the four edge Penrose GIQ data provides a power centroid from all four edges>65 dB using the above-described Penrose transform and filtering operations.

Figure 13:
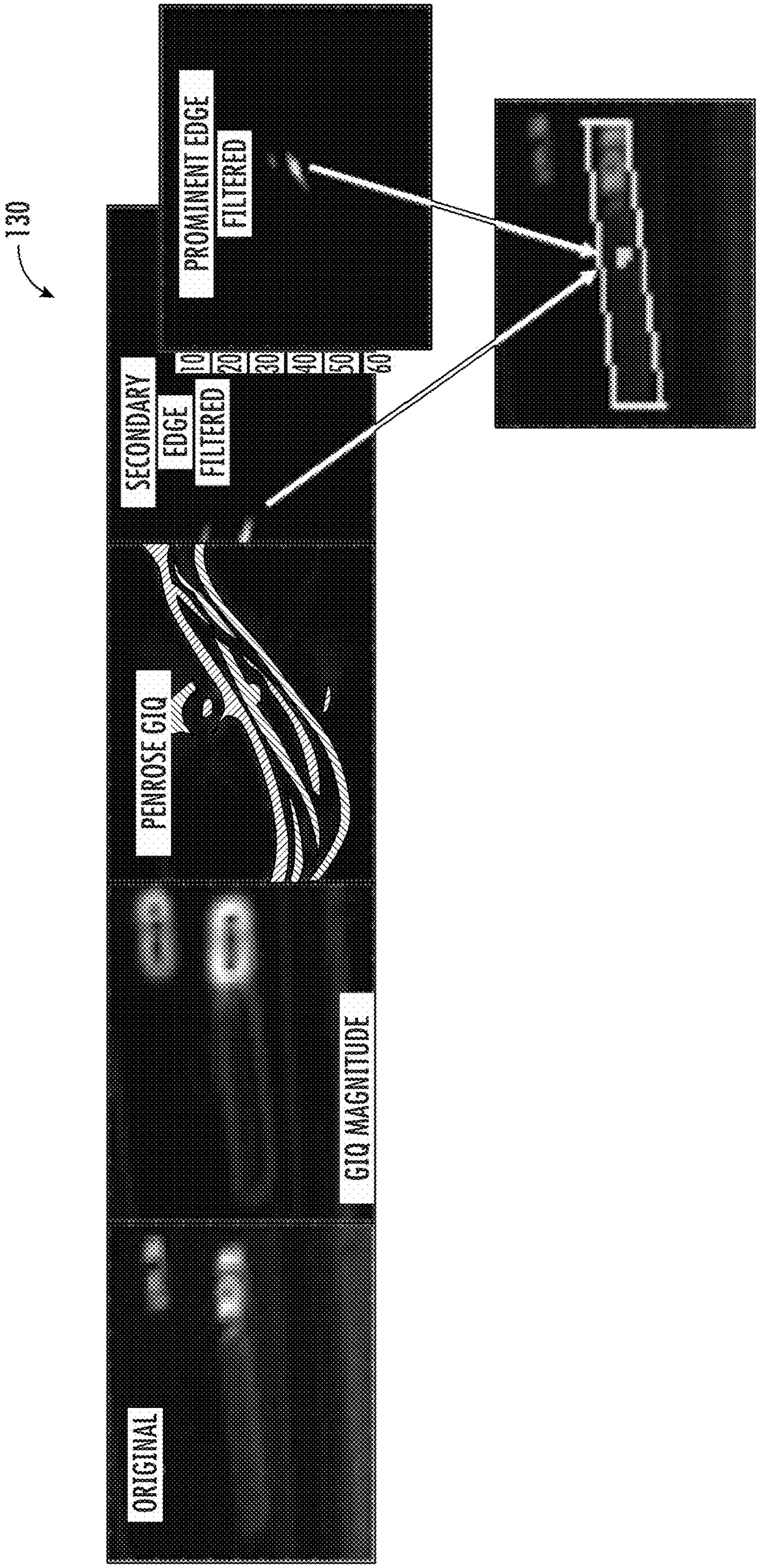
FIG. 13 is a series of image and gradient data representations illustrating object detection operations in an example embodiment where the object is a semi-truck.

Turning now to the diagram 130 of FIG. 13, in the original image the intensity is dim for the semi-truck trailer shown therein and difficult to discriminate from the background. While the GIQ magnitude data highlights vehicle and road edges, the gradient intensity for the semi-truck is still too dim to detect. The Penrose GIQ data shows features of the semi-truck, though all are not vivid until combined. The four edge Penrose GIQ filtered data advantageously provides a power centroid and accurate edges for mensuration.

Figure 14:
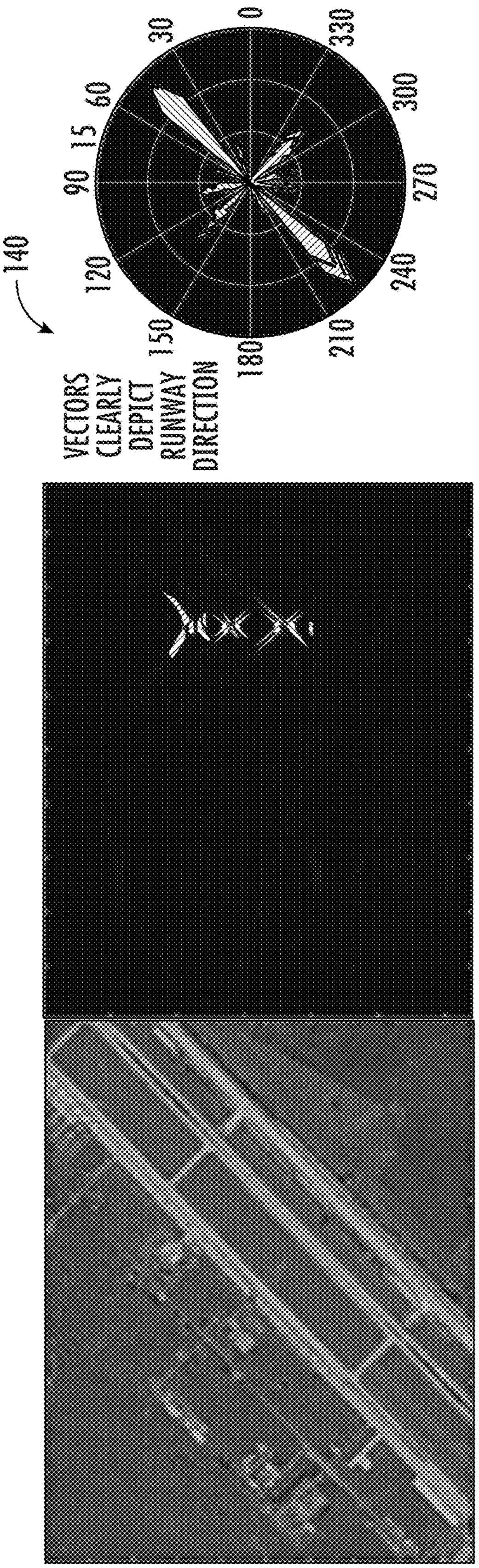
FIGS. 14 and 15 include image and gradient data representations illustrating object detection operations in an example embodiment where the scene is an airfield.
Figure 15:
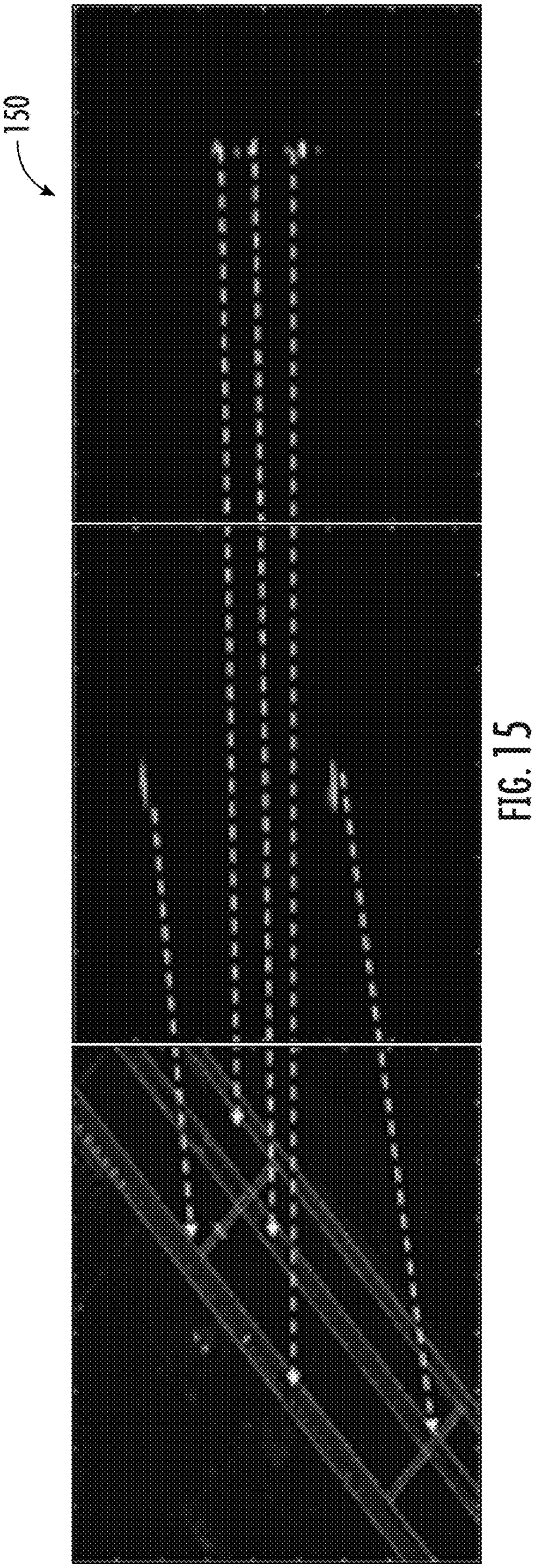

Referring now to the diagrams 140 and 150 of FIGS. 14 and 15, an airfield detection scenario is shown. As the gradient information goes through the Penrose complex filtering process, edges integrate coherently, then symmetry integrates two or more edges coherently, which may improve signal-to-noise gains by multiple orders of magnitude. The resultant vectors clearly depict the runway edges and direction (orientation), and the edge filtering identifies the edges of the runways.

Figure 16:
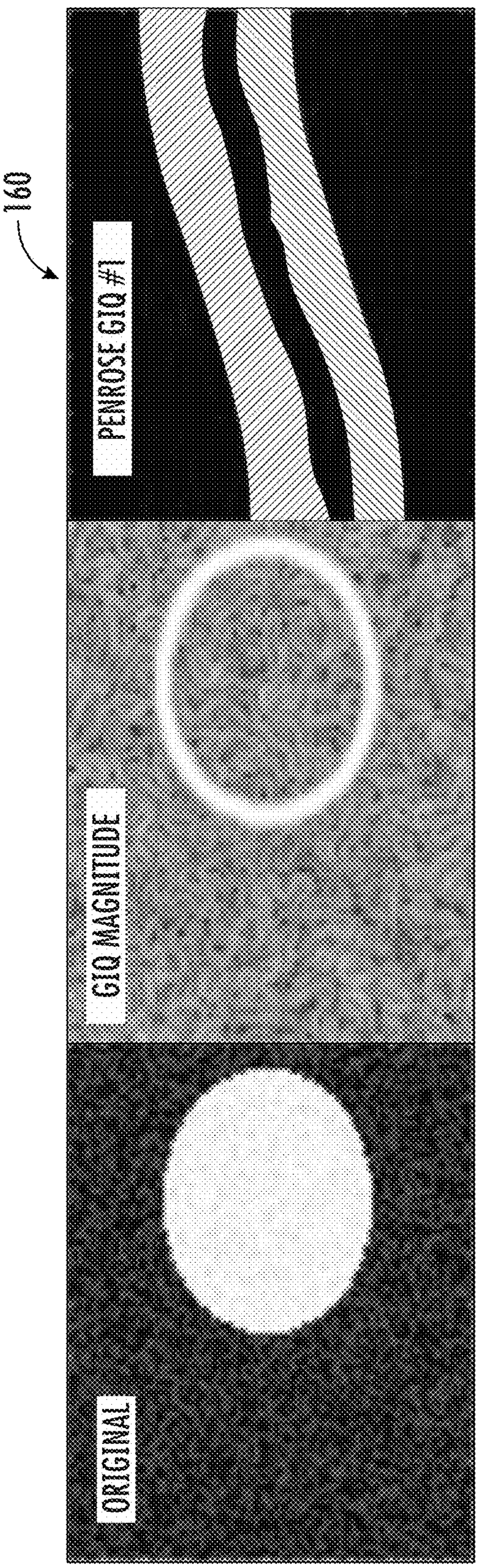
FIGS. 16 and 17 include image and gradient data representations illustrating object detection operations in an example embodiment where the object is circular in shape.
Figure 17:
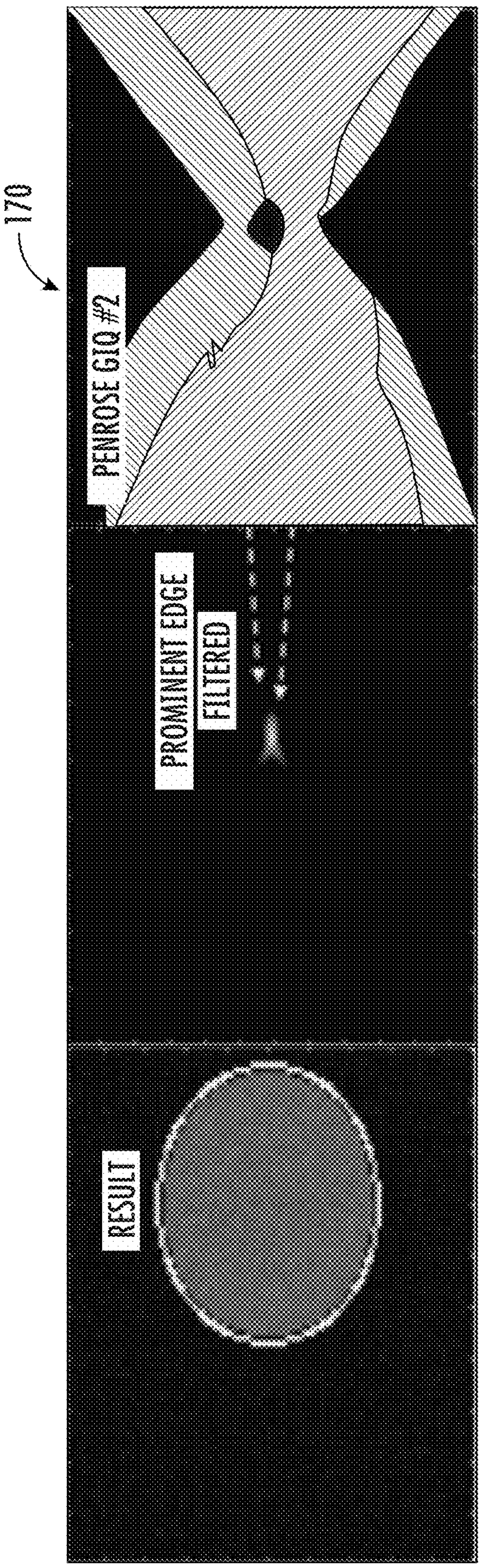

In another example implementation illustrated the diagrams 160 and 170 of FIGS. 16 and 17, resolution of curved and circular objects is provided. As points on a line intersect to create a point in Penrose space, a curve or circle creates a mostly linear signature. A second Penrose transform may be used to compress this signature to a point while preserving the phase relationship (FIG. 17).

Figure 18A:
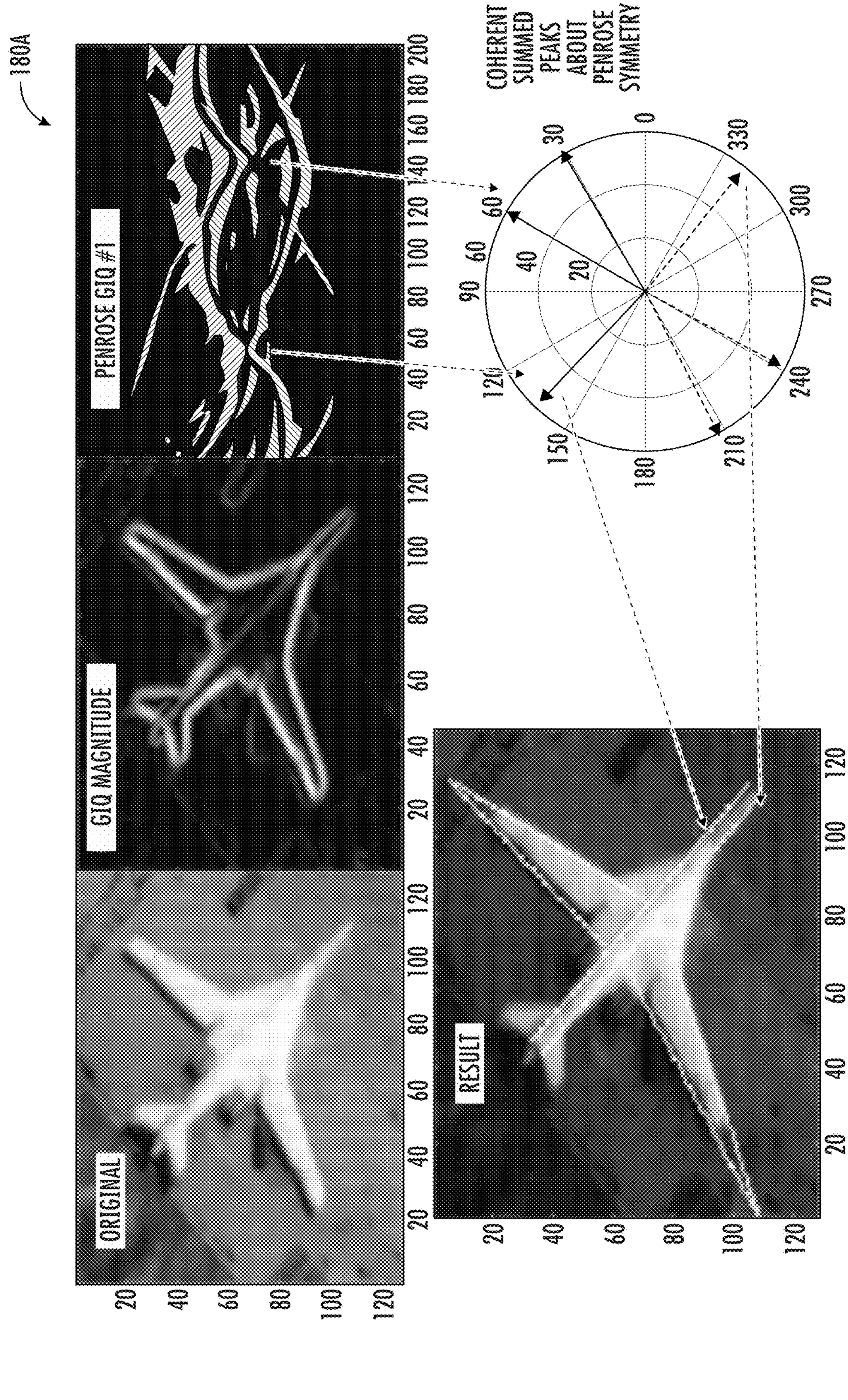
FIGS. 18A and 18B include image and gradient representations illustrating object detection operations in example embodiments where the object is an airplane.
Figure 18B:
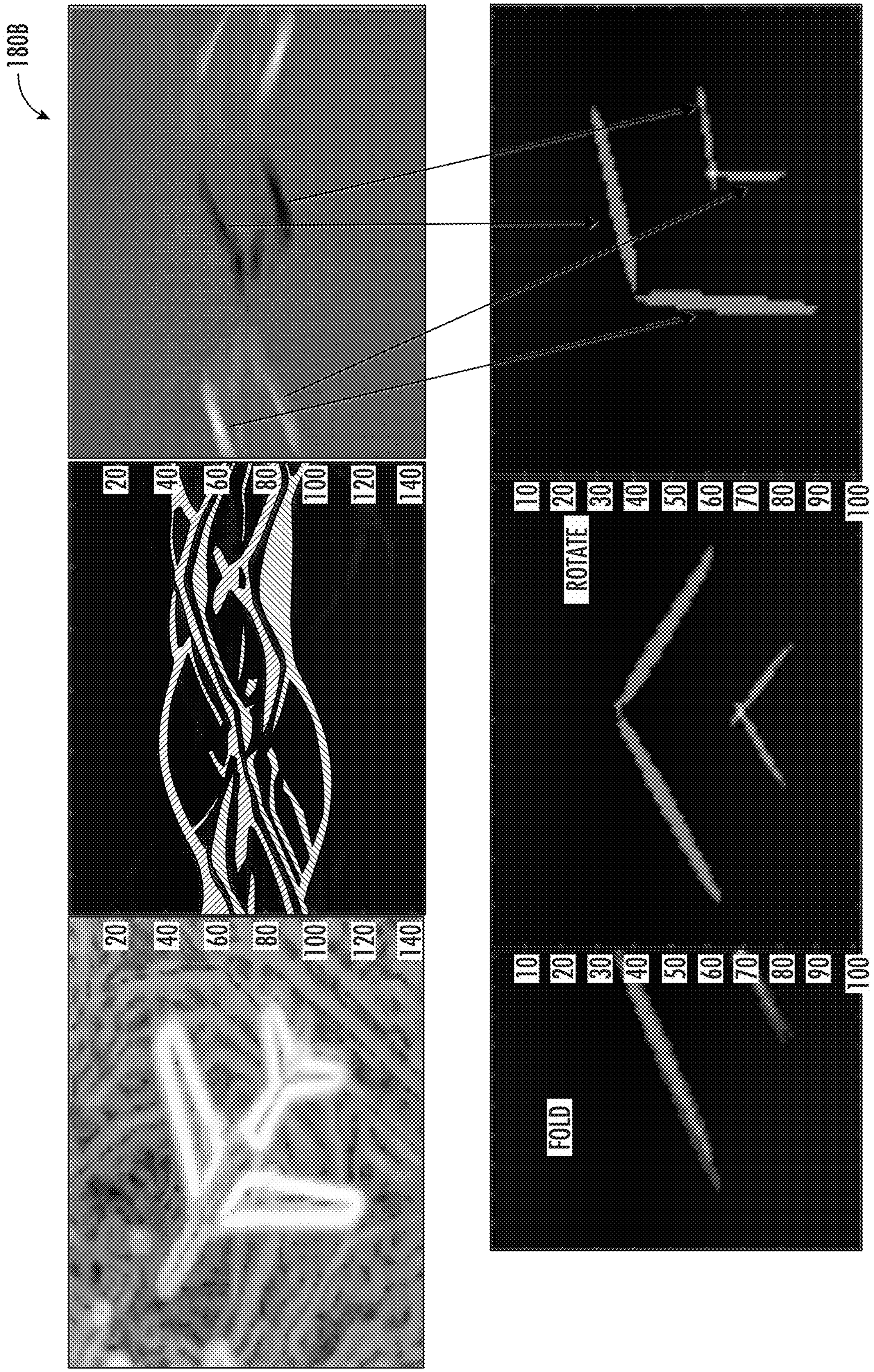

Turning now to the diagrams 180A and 180B of FIGS. 18A and 18B, respectively, example airplane detection scenarios are provided. In the diagram 180A, symmetry improves SNR for detection, but also IDs each axis at 43 and 143 degrees. Moreover, the top 6 of 7 vectors align with the outline of the airplane target as shown, resulting in coherent summed peaks about the Penrose symmetry. Further, the diagram 180B shows that not just edges but also other features derived from symmetry and their respective separations can be detected and assessed using the present approach.

Figure 19:
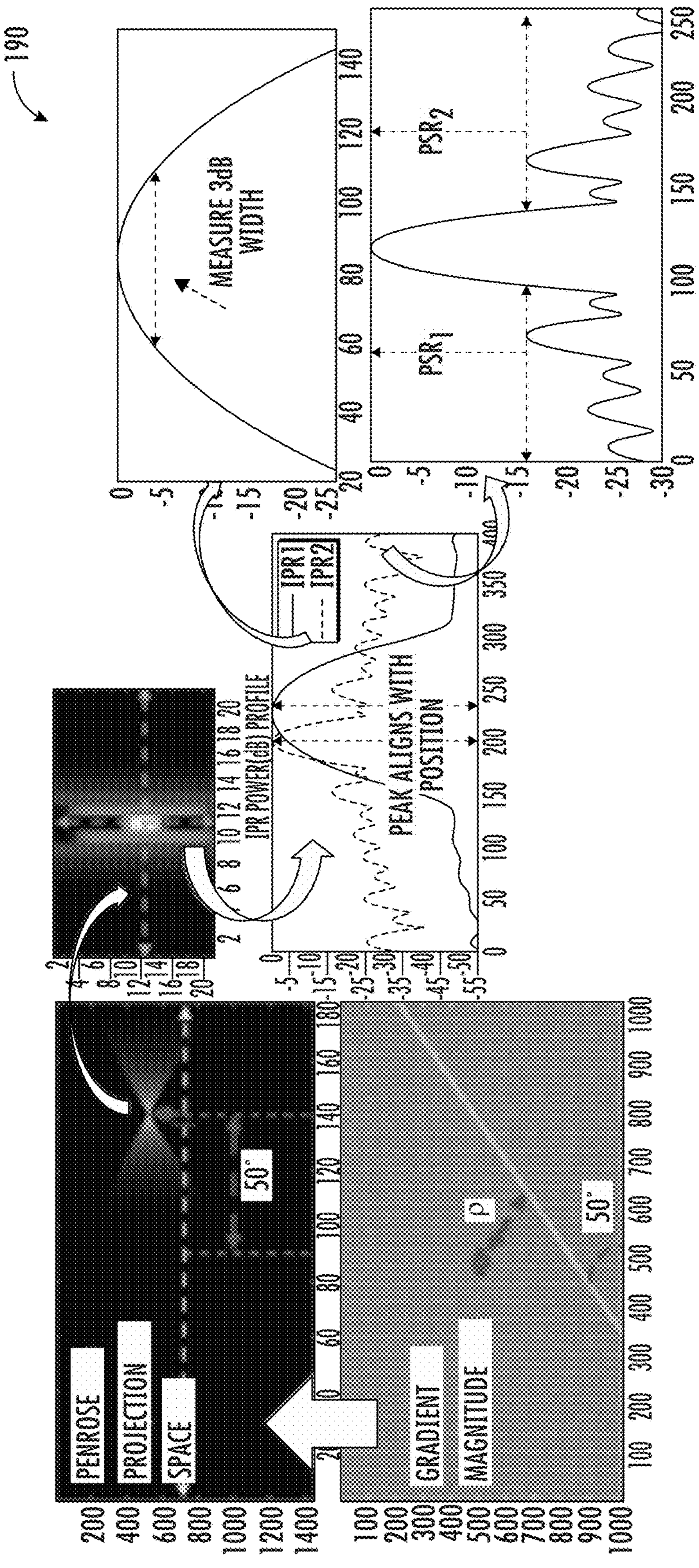
FIG. 19 is a set of gradient data representations and graphs illustrating Penrose machine learning metrics in an example embodiment.

Referring additionally to the diagram 190 of FIG. 19, example Penrose machine learning (ML) metrics for an airfield object recognition scenario derived from SAR IRP metrics and analysis are provided. These metrics include: AIR—AFLO an area-to-image ratio; CTR—clutter-to-tarmac ratio computer from the edge gradient magnitude (EGM) mean and sigma; GIPR resolution—a measure of IPR width response at airfield orientation from Penrose GIQ projection; SCU$SCR_{\rho}$—airfield signal-to-clutter ratio, a measure of IPR PSR at airfield orientation from Penrose GIQ; and ISC$ISCR_{\rho}$—integrated airfield signal-to-clutter rations, a measure of IPR PSR Penrose GIQ at orientation. However, other metrics may be used in different embodiments and scenarios. Example prediction models for machine learning implementations include National Imagery Interpretability Rating Scale (NIIRS) and image quality evaluation (IQE) models, although other suitable models may be used in different embodiments.

The above-described approach may advantageously be applied for multi-mode light weight detector (LWD) applications including prediction, guidance, registration, detection, and identification, for example. Usage of the Penrose GIQ (directional complex edge information) approach may also provide an explainable and sustainable, low complexity/SWAP cost, system that can be used for multiple applications, as demonstrated above. Moreover, not only does the Penrose GIQ processing discussed herein provide desired explainability, but also direction detection of known prominent and discriminating object features. Overall, the present approach provides for a vast reduction of the dimensionality of operational performance space, thereby minimizing the number of training samples, and lowering computational and data storage training costs.

Figure 20:
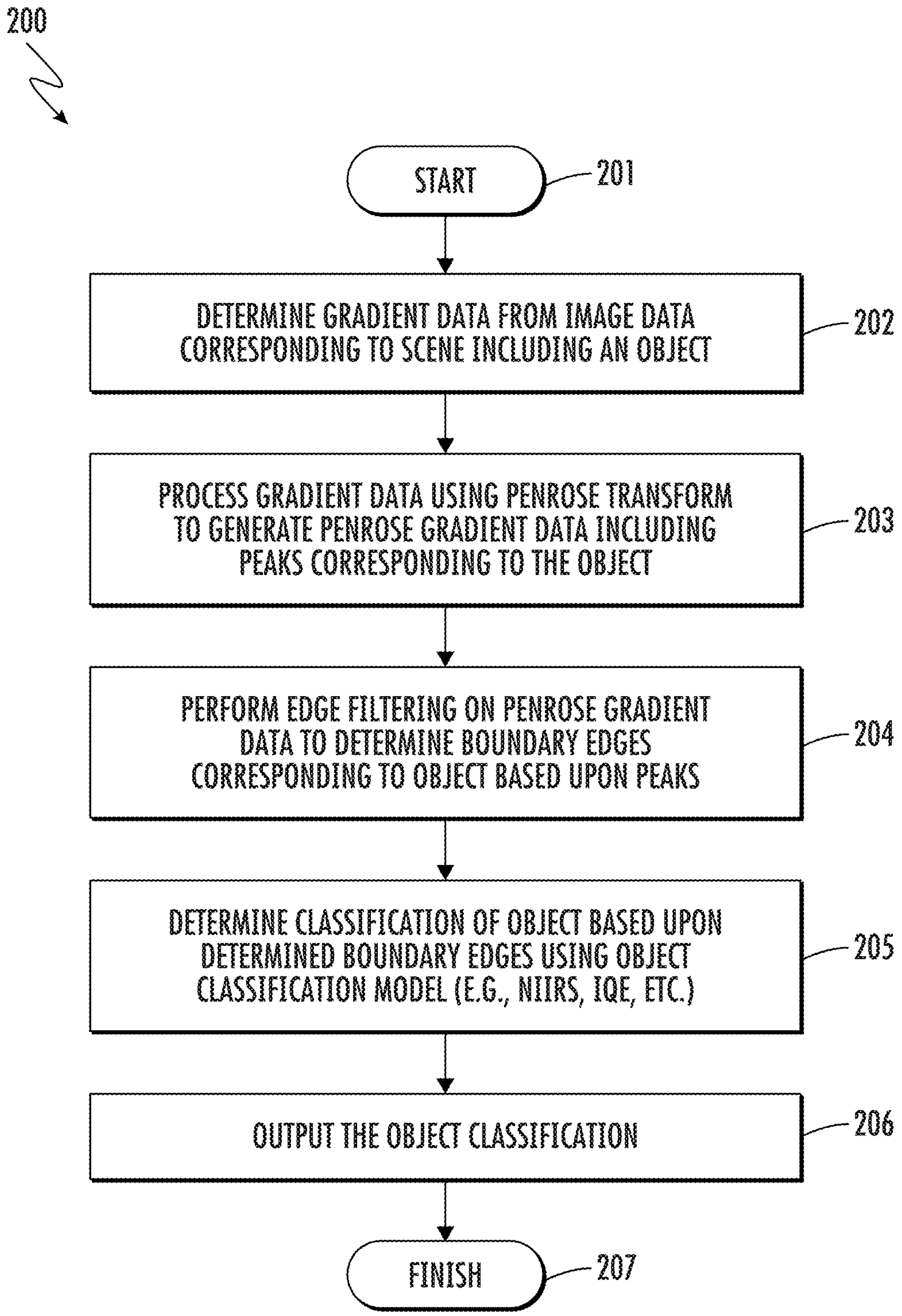
FIG. 20 is a flow diagram illustrating method aspects corresponding to the object detection system of FIG. 1.

Turning to the flow diagram 200 of FIG. 20, example method aspects associated with the system 30 are now described. Beginning at Block 201, the processor 32 determines gradient data from image data corresponding to a scene (with the scene including an object therein), at Block 202, processes the gradient data using a Penrose transform to generate Penrose gradient data including a plurality of peaks corresponding to the object (Block 203), and performs edge filtering on the Penrose gradient data to determine boundary edges corresponding to the object based upon the plurality of peaks (Block 204), as discussed further above. The processor 32 further determines a classification of the object based upon the determined boundary edges using an object classification model, at Block 205, and outputs the object classification, at Block 206, which illustratively concludes the method of FIG. 20 (Block 207).

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. An object detection system comprising:
a memory and a processor cooperating with the memory to
determine gradient data from image data corresponding to a scene, the scene including an object therein,
process the gradient data using a Penrose transform to generate Penrose gradient data including a plurality of peaks corresponding to the object,
perform edge filtering on the Penrose gradient data to determine boundary edges corresponding to the object based upon the plurality of peaks,
determine a classification of the object based upon the determined boundary edges using an object classification model, and
output the object classification.

2. The object detection system of claim 1 wherein the scene comprises a geospatial scene, and wherein the processor is configured to determine a geospatial location of the object from the boundary edges and output the geospatial location with the object classification.

3. The object detection system of claim 1 wherein the boundary edges define a centroid point for the object.

4. The object detection system of claim 1 wherein the edge filtering comprises a primary edge filtering to determine first boundary edges, and a secondary edge filtering to determine second boundary edges smaller than the first boundary edges.

5. The object detection system of claim 1 wherein the plurality of peaks are arranged in symmetrical pairs corresponding to bi-laterally symmetrical portions of the object.

6. The object detection system of claim 1 wherein the Penrose transform comprises a first Penrose transform; and wherein the processor further processes the gradient data using a second Penrose transform based upon generation of a linear signature from the first Penrose transform.

7. The object detection system of claim 1 wherein the gradient data comprises gradient in-phase and quadrature-phase (GIQ) data.

8. The object detection system of claim 7 wherein the GIQ data comprises GIQ magnitude data.

9. The object detection system of claim 1 wherein the processor is configured to convert synthetic aperture radar (SAR) data to the image data prior to determining the gradient data therefrom.

10. The object detection system of claim 1 wherein the object classification model comprises at least one of a National Imagery Interpretability Rating Scale (NIIRS) model and an image quality evaluation (IQE) model.

11. An object detection system comprising:
a memory and a processor cooperating with the memory to
determine gradient in-phase and quadrature-phase (GIQ) data from image data corresponding to a geospatial scene, the scene including an object therein,
process the GIQ data using a Penrose transform to generate Penrose GIQ data including a plurality of peaks corresponding to the object,
perform edge filtering on the Penrose GIQ data to determine boundary edges corresponding to the object based upon the plurality of peaks,
determine a classification of the object based upon the determined boundary edges using an object classification model,
determine a geospatial location of the object from the boundary edges and output the geospatial location with the object classification, and
output the object classification and geospatial location.

12. The object detection system of claim 11 wherein the boundary edges define a centroid point for the object.

13. The object detection system of claim 11 wherein the edge filtering comprises a primary edge filtering to determine first boundary edges, and a secondary edge filtering to determine second boundary edges smaller than the first boundary edges.

14. The object detection system of claim 11 wherein the plurality of peaks are arranged in symmetrical pairs corresponding to bi-laterally symmetrical portions of the object.

15. The object detection system of claim 11 wherein the Penrose transform comprises a first Penrose transform; and wherein the processor further processes the gradient data using a second Penrose transform based upon generation of a linear signature from the first Penrose transform.

16. An object detection method comprising:
using a processor and a memory associated therewith to
determine gradient data from image data corresponding to a scene, the scene including an object therein,
process the gradient data using a Penrose transform to generate Penrose gradient data including a plurality of peaks corresponding to the object,
perform edge filtering on the Penrose gradient data to determine boundary edges corresponding to the object based upon the plurality of peaks,
determine a classification of the object based upon the determined boundary edges using an object classification model, and
output the object classification.

17. The method of claim 16 wherein the scene comprises a geospatial scene, and further comprising using the processor to determine a geospatial location of the object from the boundary edges and output the geospatial location with the object classification.

18. The method of claim 16 wherein the boundary edges define a centroid point for the object.

19. The method of claim 16 wherein the edge filtering comprises a primary edge filtering to determine first boundary edges, and a secondary edge filtering to determine second boundary edges smaller than the first boundary edges.

20. The method of claim 16 wherein the plurality of peaks are arranged in symmetrical pairs corresponding to bi-laterally symmetrical portions of the object.

21. The method of claim 16 wherein the Penrose transform comprises a first Penrose transform; and further comprising using the processor to process the gradient data using a second Penrose transform based upon generation of a linear signature from the first Penrose transform.

22. The method of claim 16 wherein the gradient data comprises gradient in-phase and quadrature-phase (GIQ) data.

* * * * *